(12) United States Patent
Aoyama et al.

(10) Patent No.: US 9,073,581 B2
(45) Date of Patent: Jul. 7, 2015

(54) WORKING VEHICLE

(71) Applicant: Kubota Corporation, Osaka-shi (JP)

(72) Inventors: Kenichi Aoyama, Sakai (JP); Shinsuke Kashiyama, Sakai (JP); Shinichiro Matsuda, Sakai (JP); Megumi Sawai, Sakai (JP); Kazunobu Sugano, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/017,542

(22) Filed: Sep. 4, 2013

(65) Prior Publication Data

US 2014/0251713 A1  Sep. 11, 2014

(30) Foreign Application Priority Data

Mar. 7, 2013 (JP) ................................ 2013-045352
Mar. 7, 2013 (JP) ................................ 2013-045354

(51) Int. Cl.
  *B60K 13/04* (2006.01)
  *B62D 25/12* (2006.01)
  *B62D 25/08* (2006.01)
  *B62D 25/10* (2006.01)

(52) U.S. Cl.
  CPC ............... *B62D 25/12* (2013.01); *B60K 13/04* (2013.01); *B62D 25/082* (2013.01); *B62D 25/10* (2013.01)

(58) Field of Classification Search
  CPC ............................... B60K 13/04; B62D 25/10
  USPC .................. 180/309, 89.17, 69.2, 69.21, 68.3
  See application file for complete search history.

(56) References Cited

U.S. PATENT DOCUMENTS

| | | | | |
|---|---|---|---|---|
| 2,708,920 A * | 5/1955 | Pasturczak | .................. | 180/68.3 |
| 3,307,336 A * | 3/1967 | Dewsberry | .................. | 180/68.3 |
| 4,126,199 A * | 11/1978 | Hansen et al. | ............... | 180/68.3 |
| 6,030,029 A * | 2/2000 | Tsuda et al. | ............... | 180/89.17 |
| 6,032,620 A * | 3/2000 | Tsukiana et al. | ........... | 123/41.48 |
| 6,206,122 B1 * | 3/2001 | Boothman et al. | ......... | 180/89.17 |
| 7,475,750 B2 * | 1/2009 | Tokuhara | ..................... | 180/69.2 |
| 7,556,309 B2 * | 7/2009 | Ayabe | ........................ | 180/89.17 |
| 8,100,212 B2 * | 1/2012 | Sawai et al. | .................. | 180/69.2 |
| 8,371,408 B2 * | 2/2013 | Kawashiri et al. | ......... | 180/69.21 |
| 8,752,663 B2 * | 6/2014 | Kimura | .......................... | 180/309 |
| 8,857,384 B2 | 10/2014 | Yotsuzuka | | |
| 2005/0211487 A1 * | 9/2005 | Obe et al. | .................... | 180/69.21 |
| 2009/0098961 A1 * | 4/2009 | Hasegawa et al. | .............. | 474/61 |
| 2013/0068177 A1 | 3/2013 | Yotsuzuka | | |
| 2013/0186077 A1 | 7/2013 | Morimoto et al. | | |

FOREIGN PATENT DOCUMENTS

| | | |
|---|---|---|
| JP | 2004122877 A | 4/2004 |
| JP | 201260955 A | 3/2012 |
| KR | 20120123665 A | 11/2012 |
| KR | 20130014393 A | 2/2013 |

* cited by examiner

*Primary Examiner* — Hau Phan
(74) *Attorney, Agent, or Firm* — The Webb Law Firm

(57) ABSTRACT

A working vehicle includes a traveling machine assembly, a drive unit, a bonnet configured to cover the drive unit, and a cover provided below the bonnet and configured to be removably attached to the traveling machine assembly, including a main body portion extending in a longitudinal direction of the traveling machine assembly, a first male engagement portion provided at a front end portion of the main body portion, a second male engagement portion provided at a rear end portion of the main body portion, and a third male engagement portion provided at a lower end portion of the main body portion.

13 Claims, 13 Drawing Sheets

WORKING VEHICLE

CROSS-REFERENCE TO RELATED APPLICATIONS

This application claims priority to Japanese Patent Application Nos. 2013-045352 and 2013-045354, both filed Mar. 7, 2013, the disclosures of which are hereby incorporated in their entirety by reference.

BACKGROUND OF THE INVENTION

1. Field of the Invention

The present invention relates to working vehicles.

2. Description of the Related Art

A working vehicle has been proposed that includes a cover that is located below a bonnet covering a drive unit and is removably attached to a traveling machine assembly. An example cover attachment structure in such a working vehicle is described in, for example, JP 2004-122877A (particularly, FIG. 4). In the cover attachment structure of JP 2004-122877A, two attachment holes are provided in a lower end portion of the cover, two (upper and lower) horizontal plates are provided on an inner surface of the cover, engaging/retaining pieces are provided in a lower portion of the traveling machine assembly, corresponding to the respective attachment holes, and an engagement/disengagement mechanism with or from which the horizontal plates are engaged or disengaged is provided on the traveling machine assembly.

In the case of the above structure, the cover is attached to the traveling machine assembly as follows. Initially, the attachment holes of the cover are engaged with the engaging/retaining pieces while the cover is held in an angled position with respect to the transverse direction of the traveling machine assembly. Next, while the attachment holes and the engaging/retaining pieces are maintained engaged together, the cover is swung around the attachment holes as a pivot to an upright position so that an upper end portion of the cover is raised toward the traveling machine assembly and the horizontal plates of the cover are then engaged with the engagement/disengagement mechanism. Thus, the cover may be attached to the traveling machine assembly.

Another working vehicle has been proposed that includes an exhaust device that includes an exhaust path through which exhaust gas from an engine is emitted to the outside, and an outside air introduction portion that is provided at an intermediate point of the exhaust path to introduce and mix outside air into the exhaust gas.

In the above exhaust device, the outside air introduction portion may allow outside air to be mixed into the exhaust gas from the engine, whereby the exhaust gas having reduced exhaust temperature may be emitted to the outside. For example, the outside air introduction portion includes a first flow pipe having a smaller diameter and a second flow pipe having a larger diameter. A downstream end portion of the first flow pipe and an upstream end portion of the second flow pipe form a double-pipe structure in which the first flow pipe is located inside the second flow pipe with a gap being provided between the first and second flow pipes (see, for example, JP 2012-60955A). The double-pipe structure may allow for an ejector action on exhaust gas flowing from the first flow pipe to the second flow pipe, whereby outside air may be introduced through the gap between the first and second flow pipes to be mixed into the exhaust gas, so that the exhaust temperature may be reduced.

SUMMARY OF THE INVENTION

However, in the technique described in JP 2004-122877A, when the cover is attached to the traveling machine assembly, the cover is swung while the attachment holes and the engaging/retaining pieces are engaged together so that the horizontal plates are engaged with the engagement/disengagement mechanism. To achieve this, the cover needs to be allowed to swing while the attachment holes and the engaging/retaining pieces are engaged together. Therefore, the attachment hole has a larger dimension than that of the engaging/retaining piece. For this reason, when the cover is swung so that the horizontal plates are engaged with the engagement/disengagement mechanism, the cover is likely to be incorrectly positioned, so that the position of the cover needs to be adjusted. Therefore, it takes time and effort to attach the cover.

Under these circumstances, there is a demand for a working vehicle in which the cover can be easily attached to the traveling machine assembly.

Another working vehicle has recently been proposed that includes an exhaust cleaning device for trapping and removing particulate substance, such as soot or the like, which is contained in exhaust gas from an engine. In this exhaust cleaning device, in order to prevent the trap function from being reduced due to deposition of the trapped particulate substance, the trapped particulate substance is heated by a heating means to be burnt and removed (restoration process). Therefore, during the restoration process, the temperature of exhaust gas emitted from the exhaust cleaning device becomes higher than the typical exhaust temperature. Therefore, the exhaust device is required to reduce the high exhaust temperature.

To address this problem, the exhaust device of JP 2012-60955A includes two outside air introduction portions that are provided at an intermediate point of the exhaust path and separated from each other by a spacing. Therefore, the amount of outside air to be mixed into the exhaust gas from the engine may be increased, whereby the temperature of the hotter exhaust gas may be reduced.

However, in the exhaust device of JP 2012-60955A, the two outside air introduction portions are provided at an external flow path portion of the exhaust path that is exposed to the outside. Therefore, the external flow path portion needs to have a sufficient length to accommodate the two outside air introduction portions, so that the exhaust path is longer than typical exhaust paths, and therefore, has a complicated configuration. Due to the increased length of the external flow path portion, the exhaust path needs to be disposed while avoiding interference with other members, likely leading to adjustment of the location or a more complex support configuration.

Under these circumstances, there is a demand for a working vehicle in which the temperature of hotter exhaust gas can be reduced using an exhaust path having a simple configuration.

A working vehicle according to the present invention includes a traveling machine assembly, a drive unit, a bonnet configured to cover the drive unit, and a cover provided below the bonnet and configured to be removably attached to the traveling machine assembly. The cover includes a main body portion extending in a longitudinal direction of the traveling machine assembly, a first male engagement portion provided at a front end portion of the main body portion, a second male engagement portion provided at a rear end portion of the main body portion, and a third male engagement portion provided at a lower end portion of the main body portion. The traveling machine assembly includes a first female engagement portion configured to be engaged with the first male engagement portion, a second female engagement portion configured to be engaged with the second male engagement portion, and a third female engagement portion configured to be engaged with the third male engagement portion. The first male engagement portion and the first female engagement portion, when engaged together, permit the main body portion to move in the longitudinal direction of the traveling machine assembly. The second male engagement portion and the second female engagement portion, when engaged together, permit the main body portion to move in the longitudinal direction of the traveling machine assembly. A position where the third male engagement portion and the third female engagement portion are engaged together is within a range in which the main body portion is permitted to move in the longitudinal direction of the traveling machine assembly, when the first male engagement portion and the first female engagement portion are engaged together and the second male engagement portion and the second female engagement portion are engaged together. The third male engagement portion and the third female engagement portion, when engaged together, limit movement of the main body portion in the longitudinal direction of the traveling machine assembly.

With this configuration, initially, for example, the first male engagement portion provided at the front end portion of the main body portion is engaged with the first female engagement portion of the traveling machine assembly, and in their engaged state, the main body portion can be moved in the longitudinal direction of the traveling machine assembly so that the second male engagement portion provided at the rear end portion of the main body portion is engaged with the second female engagement portion of the traveling machine assembly. When the first male engagement portion and the first female engagement portion are engaged together and the second male engagement portion and the second female engagement portion are engaged together, movement of the main body portion in the transverse direction of the traveling machine assembly is limited, while the main body portion is permitted to move in the longitudinal direction of the traveling machine assembly.

Also, when the first male engagement portion and the first female engagement portion are engaged together and the second male engagement portion and the second female engagement portion are engaged together, the position where the third male engagement portion provided at the lower end portion of the main body portion and the third female engagement portion of the traveling machine assembly are engaged together is set to be within the range in which the main body portion is permitted to move in the longitudinal direction of the traveling machine assembly. Therefore, while movement of the main body portion in the transverse direction of the traveling machine assembly is limited, the main body portion can be permitted to move in the longitudinal direction of the traveling machine assembly to a position that allows the third male engagement portion and the third female engagement portion to be engaged together.

Next, when the first male engagement portion and the first female engagement portion are engaged together and the second male engagement portion and the second female engagement portion are engaged together, and in addition, the third male engagement portion and the third female engagement portion are engaged together, movement of the main body portion in the longitudinal direction of the traveling machine assembly is limited, whereby the cover is positioned with respect to the traveling machine assembly. Thus, the cover can be positioned by a simple operation, and therefore, can be easily attached to the traveling machine assembly. In the above configuration, the amount of movement of the main body portion in the longitudinal direction of the traveling machine assembly that is permitted when the first male engagement portion and the first female engagement portion are engaged together is preferably different from the amount of movement of the main body portion in the longitudinal direction of the traveling machine assembly that is permitted when the second male engagement portion and the second female engagement portion are engaged together.

With this configuration, the cover can be easily changed to a state in which the first male engagement portion and the first female engagement portion are engaged together, and at the same time, the second male engagement portion and the second female engagement portion are engaged together. For example, if the amount of movement of the main body portion in the longitudinal direction of the traveling machine assembly that is permitted when the first male engagement portion and the first female engagement portion are engaged together is larger than the amount of movement of the main body portion in the longitudinal direction of the traveling machine assembly that is permitted when the second male engagement portion and the second female engagement portion are engaged together, then when the first male engagement portion is earlier engaged with the first female engagement portion, the second male engagement portion can be easily engaged with the second female engagement portion. Conversely, if the amount of movement of the main body portion in the longitudinal direction of the traveling machine assembly that is permitted when the second male engagement portion and the second female engagement portion are engaged together is larger than the amount of movement of the main body portion in the longitudinal direction of the traveling machine assembly that is permitted when the first male engagement portion and the first female engagement portion are engaged together, then when the second male engagement portion is earlier engaged with the second female engagement portion, the first male engagement portion can be easily engaged with the first female engagement portion. Since the amount of movement permitted in the longitudinal direction of the traveling machine assembly does not become larger than necessary, the configuration can be simplified.

In the above configuration, the first male engagement portion is preferably a first protruding portion protruding from the main body portion toward a front of the traveling machine assembly. The second male engagement portion is preferably a second protruding portion protruding from the main body portion toward a rear of the traveling machine assembly. The first female engagement portion is preferably a first insertion hole into which the first protruding portion is inserted in the longitudinal direction of the traveling machine assembly. The second female engagement portion is a second insertion hole into which the second protruding portion is preferably inserted in the longitudinal direction of the traveling machine assembly.

With this configuration, when the first protruding portion protruding from the main body portion toward the front of the traveling machine assembly is inserted into the first insertion hole along the longitudinal direction of the traveling machine assembly, and the second protruding portion protruding from the main body portion toward the rear of the traveling machine assembly is inserted into the second insertion hole along the longitudinal direction of the traveling machine assembly, the main body portion is permitted to move in the longitudinal direction of the traveling machine assembly while movement of the main body portion in the transverse direction of the traveling machine assembly is limited. Thus, the protruding portions and the insertion holes can permit the main body portion to move in the longitudinal direction, resulting in a simple cover attachment structure.

Since the first male engagement portion and second male engagement portion can be a protruding portion and the first female engagement portion and the second female engagement portion can be an insertion hole, the configurations themselves of the male and female engagement portions can be simplified.

In the above configuration, the main body portion preferably has a wider portion on a front side thereof and a narrower portion on a rear side thereof, and the third male engagement portion is preferably located at the wider portion.

With this configuration, since the main body portion has a wider portion on a front side thereof and a narrower portion on a rear side thereof, the center of gravity of the main body portion is located in the wide portion, and the third male engagement portion provided at the lower end portion of the main body portion is disposed in the wide portion close to the center of gravity. Therefore, the main body portion can be easily moved in the longitudinal direction of the traveling machine assembly in order to engage the third male engagement portion with the third female engagement portion, and in addition, when the third male engagement portion and the third female engagement portion are engaged together, the main body portion can be stably supported by the third female engagement portion. In the above configuration, the cover is preferably arranged to cover a lateral outer surface with respect to the traveling machine assembly of an exhaust pipe linked to an engine of the drive unit.

With this configuration, the cover is arranged to cover a lateral outer surface with respect to the traveling machine assembly of an exhaust pipe linked to an engine of the drive unit, i.e., the cover is located at a position where the cover is somewhat easily influenced by heat. However, the first male engagement portion and the first female engagement portion, when engaged together, permit the main body portion to move in the longitudinal direction of the traveling machine assembly, and the second male engagement portion and the second female engagement portion, when engaged together, permit the main body portion to move in the longitudinal direction of the traveling machine assembly. Therefore, there is play between the first male engagement portion and the first female engagement portion and between the second male engagement portion and the second female engagement portion in the longitudinal direction of the traveling machine assembly. Therefore, even if the cover is, for example, somewhat deformed by the influence of the heat of the exhaust pipe, the cover can be removed from the traveling machine assembly without difficulty.

In the above configuration, the first female engagement portion is preferably formed in an accessory of an engine of the drive unit.

With this configuration, the first female engagement portion on the traveling machine assembly can be formed using an accessory, e.g., a fan shroud, of an engine of the drive unit. Therefore, existing parts can be effectively used, resulting in a low-cost cover attachment structure.

In the above configuration, the working vehicle preferably further includes an exhaust pipe configured to allow exhaust gas from an engine to be emitted to the outside. The exhaust pipe preferably includes a first emission pipe linked to the engine and a second emission pipe provided downstream of the first emission pipe. The second emission pipe preferably includes an upstream-end opening provided at an upstream end of the second emission pipe, and a first upper opening provided at an upstream portion of an upper surface of the second emission pipe and continuous to the upstream-end opening. A downstream end portion of the first emission pipe is preferably located at the first upper opening with a gap being provided between the downstream end portion of the first emission pipe and an edge portion of the first upper opening. A second upper opening is preferably provided in a portion downstream of the first upper opening of the upper surface of the second emission pipe. The first emission pipe preferably has a smaller cross-sectional area at the downstream end portion than upstream of the downstream end portion of the first emission pipe.

A working vehicle according to the present invention includes an engine, a bonnet configured to form an engine room for accommodating the engine, an exhaust path configured to allow exhaust gas from the engine to be emitted to the outside, including an internal flow path portion provided inside the engine room, and an external flow path portion provided outside the engine room, and an outside air introduction portion configured to allow outside air to be introduced at an intermediate point of the exhaust path so that the outside air is mixed into the exhaust gas, including a first outside air introduction portion provided in the internal flow path portion of the exhaust path and configured to allow air inside the engine room to be introduced as the outside air, and a second outside air introduction portion provided in the external flow path portion of the exhaust path and configured to allow air outside the engine room to be introduced as the outside air.

With this feature configuration, the first outside air introduction portion allows air in the engine room to be initially introduced and mixed into exhaust gas flowing through the internal flow path portion of the exhaust path. At this time, the exhaust gas flowing through the internal flow path portion has high temperature. Therefore, even when air in the engine room is mixed, the exhaust temperature can be reduced. The exhaust temperature of the exhaust gas flowing through the external flow path portion of the exhaust path is reduced at the first outside air introduction portion. Therefore, the second outside air introduction portion allows air outside the engine room having lower temperature than that of air in the engine room to be introduced and mixed into the exhaust gas, whereby the exhaust temperature can be reduced. Thus, outside air is introduced in two steps using the first and second outside air introduction portions to be mixed into the exhaust gas, whereby the exhaust temperature of the exhaust gas can be effectively reduced. In addition, the first outside air introduction portion can be provided using the engine room, and only the second outside air introduction portion is provided in the external flow path portion of the exhaust path. Therefore, the length of the external flow path portion of the exhaust path can be reduced, and therefore, the external flow path portion can have a simple configuration so that it can be provided in a limited space, and is unlikely to interfere with other members. Therefore, the exhaust temperature of hotter exhaust gas can be reduced while the configuration of the exhaust path is simplified.

In the above configuration, in the engine room, a cooling fan configured to blow air backward is preferably provided, and the first outside air introduction portion is preferably located behind the cooling fan.

With this feature configuration, the first outside air introduction portion allows air blown by the cooling fan to be actively introduced as outside air into the exhaust path. Therefore, as large an amount of outside air as possible can be easily introduced at the first outside air introduction portion, and air having relatively low temperature that is blown by the cooling fan can be introduced, whereby the exhaust temperature can be reliably reduced.

In the above configuration, the second outside air introduction portion is preferably configured to introduce a larger amount of the outside air than that of the first outside air introduction portion.

The second outside air introduction portion is required to reduce the exhaust temperature of the exhaust gas that has been reduced at the first outside air introduction portion. Therefore, a larger amount of outside air is desirably introduced and mixed into the exhaust gas. To meet this requirement, this feature configuration allows a larger amount of outside air to be introduced at the second outside air introduction portion than at the first outside air introduction portion, whereby the exhaust temperature can be effectively and more reliably reduced.

In the above configuration, the first outside air introduction portion preferably includes a first flow pipe, and a second flow pipe having a larger flow path cross-sectional area than that of the first flow pipe. A downstream end portion of the first flow pipe and an upstream end portion of the second flow pipe preferably form a double-pipe structure in which the first flow pipe is located inside the second flow pipe with a gap being interposed between the first flow pipe and the second flow pipe. The second outside air introduction portion preferably includes a third flow pipe, and a fourth flow pipe having a larger flow path cross-sectional area than that of the third flow pipe. A downstream end portion of the third flow pipe and an upstream end portion of the fourth flow pipe preferably form a double-pipe structure in which the third flow pipe is located inside the fourth flow pipe with a gap being interposed between the third flow pipe and the fourth flow pipe.

With this feature configuration, both the first outside air introduction portion and the second outside air introduction portion can be configured using a simple structure in which two flow pipes form a double-pipe structure. Therefore, even when two outside air introduction portions, i.e., the first outside air introduction portion and the second outside air introduction portion, are provided, the exhaust temperature can be effectively reduced at the two outside air introduction portions while the configuration thereof is simplified.

In the above configuration, in the engine room, an exhaust cleaning device configured to clean exhaust gas from the engine is preferably provided. The exhaust path is preferably configured to allow the exhaust gas cleaned by the exhaust cleaning device to flow to the outside. The bonnet preferably includes an opening at a position corresponding to an upper portion of the exhaust cleaning device.

With this feature configuration, the exhaust path allows exhaust gas cleaned by the exhaust cleaning device to flow to the outside, so that the exhaust gas from the exhaust cleaning device has higher temperature. However, as described above, the first outside air introduction portion and the second outside air introduction portion can be used to effectively reduce the exhaust temperature of the exhaust gas. In addition, the bonnet has an opening at a portion corresponding to an upper portion of the exhaust cleaning device, and air in the engine room is emitted through the opening to the outside, whereby the temperature of the air in the engine room can be prevented from increasing. Therefore, the air in the engine room that is introduced at the first outside air introduction portion can be caused to have lower temperature, thereby contributing to a reduction in the exhaust temperature.

DETAILED DESCRIPTION OF THE PREFERRED EMBODIMENTS

First Embodiment

Examples of the present invention will be described below with reference to the accompanying drawings.

(General Configuration of Tractor)

Figure 1:
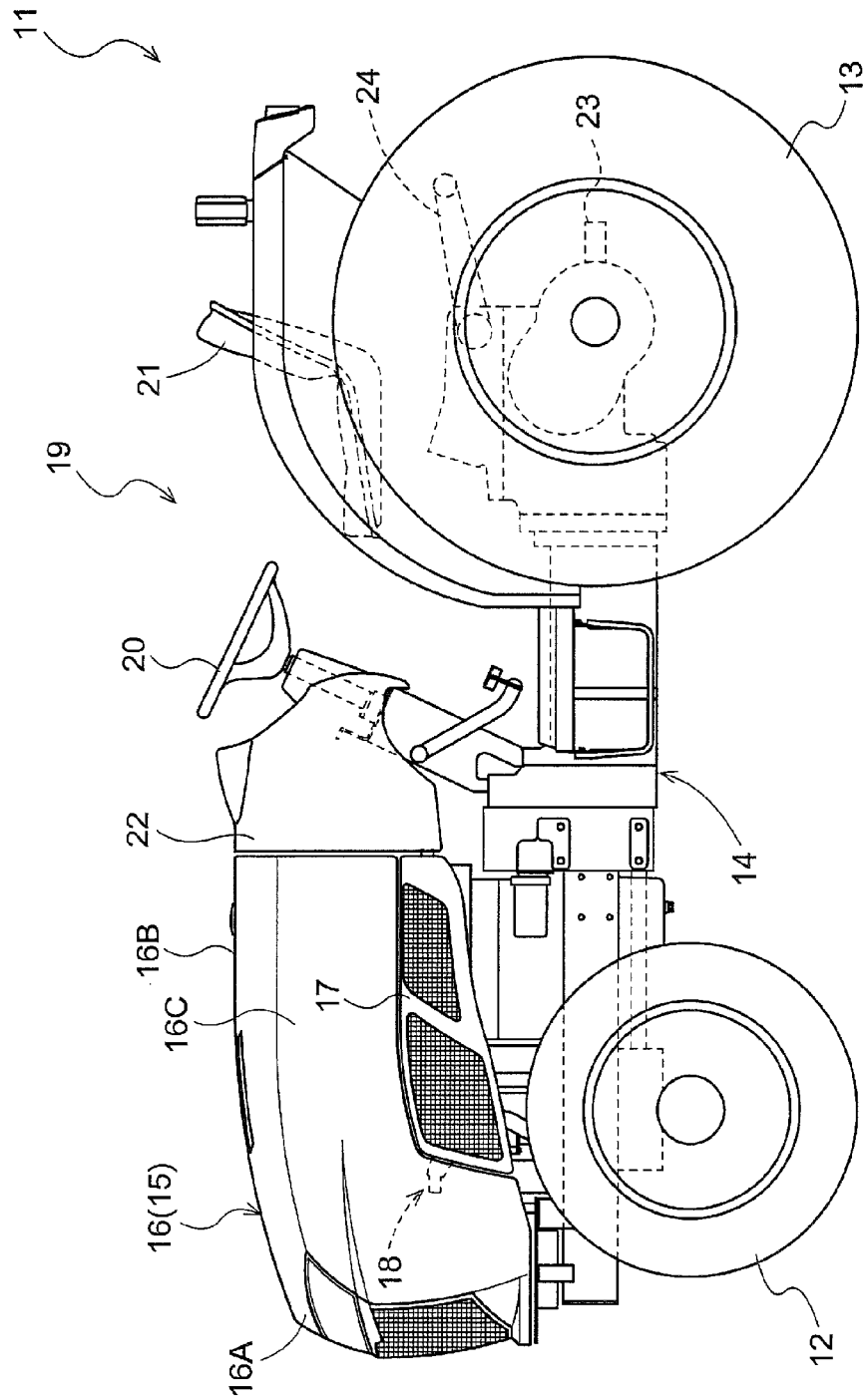
FIG. 1 is a side view showing an entire working vehicle.
Figure 2:
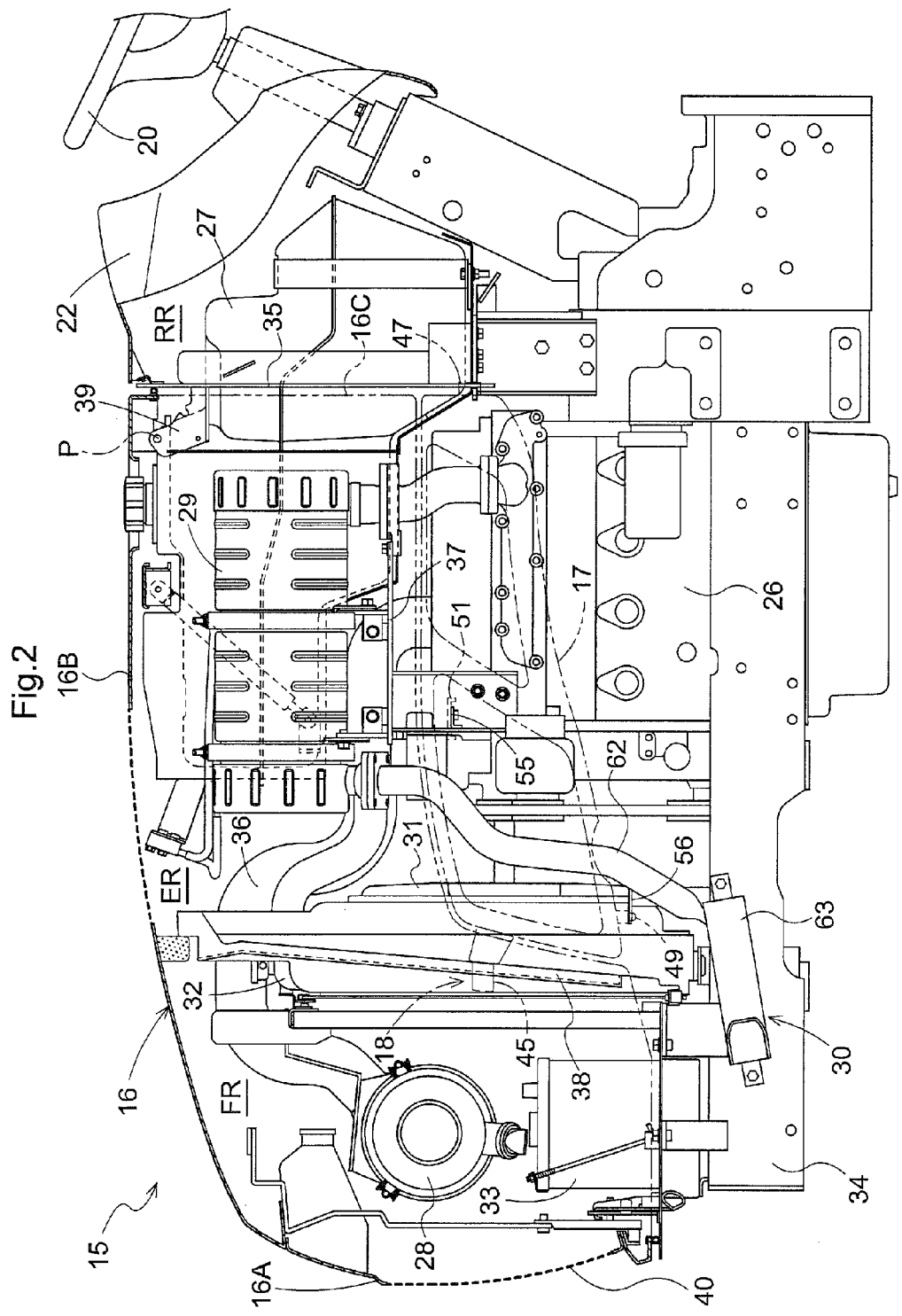
FIG. 2 is a side view showing a front portion of the working vehicle.
Figure 3:
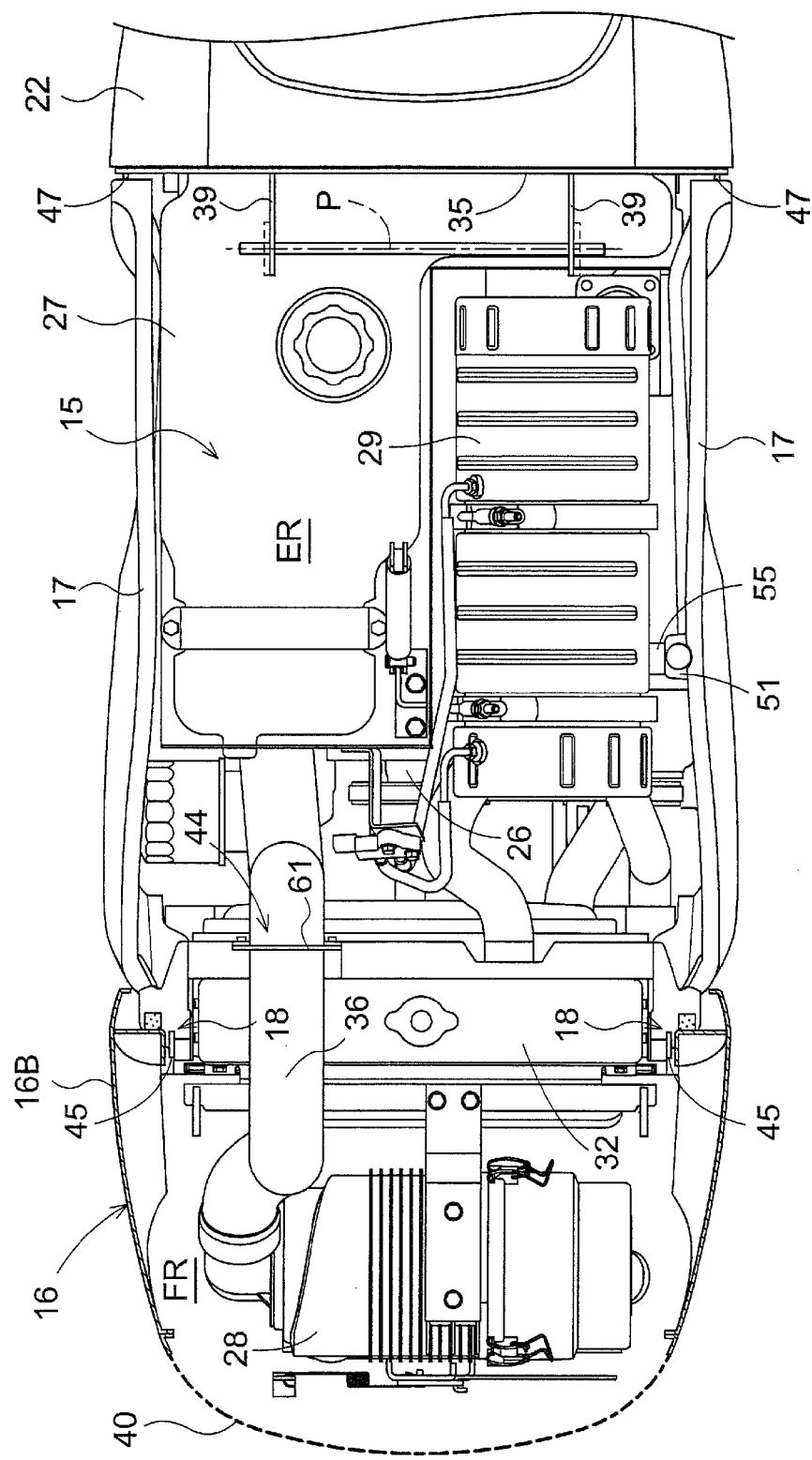
FIG. 3 is a plan view showing a front portion of the working vehicle.

As shown in FIGS. 1 to 3, a tractor 11 (an example of a "working vehicle") is of the four-wheel drive type, including a pair of left and right front wheels 12 that can be steered and driven, and a pair of left and right rear wheels 13 that can be driven, whereby a traveling machine assembly 14 is self-propelled. The tractor 11 includes, in a front portion of the traveling machine assembly 14, a drive unit 15, a bonnet 16 that covers the drive unit 15, covers 17 that are located below the bonnet 16, and cover attachment structures 18 that allow the covers 17 to be removably attached to the traveling machine assembly 14. As shown in FIG. 1, in the traveling machine assembly 14, a driving/maneuvering unit 19 is provided behind the drive unit 15. The driving/maneuvering unit 19 includes a steering wheel 20, a driver's seat 21 that is located behind the steering wheel 20, and a drive panel 22 that is located in the vicinity of the steering wheel 20. In the traveling machine assembly 14, a PTO shaft 23 and a linkage mechanism 24 are provided behind the driving/maneuvering unit 19. When a working device (not shown), such as a rotary tillage device or the like, is linked to a rear portion of the traveling machine assembly 14 via the linkage mechanism 24 in a manner that allows the working device to move up and down, and power is transmitted through the PTO shaft 23 to the working device, the tractor 11 can function as a passenger working machine that is used for a variety of works, such as tillage and the like.

As shown in FIGS. 2 and 3, the drive unit 15 includes an engine 26, a fuel tank 27, an air cleaner 28, an exhaust treatment device 29, an exhaust pipe 30, a fan 31, a radiator 32, and a battery 33. The engine 26, which is a diesel engine, is supported on a front axle frame 34 that is provided in a front portion of the traveling machine assembly 14. The fuel tank 27 is located on a lateral side of and behind the engine 26. The air cleaner 28 is located in front of the engine 26, and is linked via an inlet hose 36 to an air inlet side of the engine 26. The exhaust treatment device 29, which is used to remove fine exhaust particles contained in exhaust gas of the engine 26, is linked to an emission side of the engine 26 and is supported on an upper portion of the engine 26 via a device support frame 37. Note that the exhaust treatment device 29 filters out fine exhaust particles contained in exhaust gas of the engine 26 using an internal filter (not shown), and burns the fine exhaust particles accumulated on the filter, so that high-temperature exhaust gas is emitted from the exhaust treatment device 29. The exhaust pipe 30 is linked to the exhaust treatment device 29, and is extended to a lateral outer side of the traveling machine assembly so that exhaust gas from the engine 26 is emitted to the outside of the traveling machine assembly. The fan 31 is located in front of the engine 26, and is supported by a fan shroud 38 (an example of a "accessory of an engine"). The radiator 32 is located in front of the engine 26, and is supported on the front axle frame 34.

The bonnet 16 is allowed to swing up and down around a horizontal axis P that passes through a pair of left and right support members 39 that are provided on a partition frame 35, protruding forward. Therefore, the bonnet 16 can be switched between a closed position in which the bonnet 16 covers the drive unit 15 and an open position in which the drive unit 15 is exposed to the outside. As shown in FIG. 1, the bonnet 16 includes a front portion 16A that is located in front of the drive unit 15 when the bonnet 16 is in the closed position, a top portion 16B that is located above the drive unit 15 when the bonnet 16 is in the closed position, and side portions 16C that are located on lateral sides of the drive unit 15 when the bonnet 16 is in the closed position. As shown in FIG. 2, the front portion 16A has an intake portion 40 through which air is taken into a front space FR. As can be seen from FIGS. 1 and 2, the side portions 16C do not cover a bottom of an engine room R, which is therefore open to the outside. Therefore, heat generated by the engine 26 and the exhaust treatment device 29 in the drive unit 15 can be efficiently dissipated from lateral sides of the bonnet 16 to the outside of the traveling machine assembly 14. The covers 17 are provided at lower edge portions of rear portions of the side portions 16C of the bonnet 16. When the cover 17 is attached to the side portion 16C, the side portion 16C and the cover 17 form substantially the same plane.

As shown in FIGS. 2 and 3, when the bonnet 16 is in the closed position, the fan shroud 38 partitions an inside of the bonnet 16 into an engine room ER in which the engine 26 is provided and the front space FR that is located in front of the engine room ER. The partition frame 35 partitions an inside of the bonnet 16 into the engine room ER and a rear space RR that is located behind the engine room ER. The inlet hose 36 is inserted through an upper portion of the fan shroud 38 along the longitudinal (front-rear) direction of the traveling machine assembly, extending in the front space FR and the engine room ER. The fan shroud 38 includes a blocking structure 44 that closes a gap between the inlet hose 36 and the fan shroud 38 to block a passage between the front space FR and the engine room ER.

Cover and Cover Attachment Structure

Figure 4:
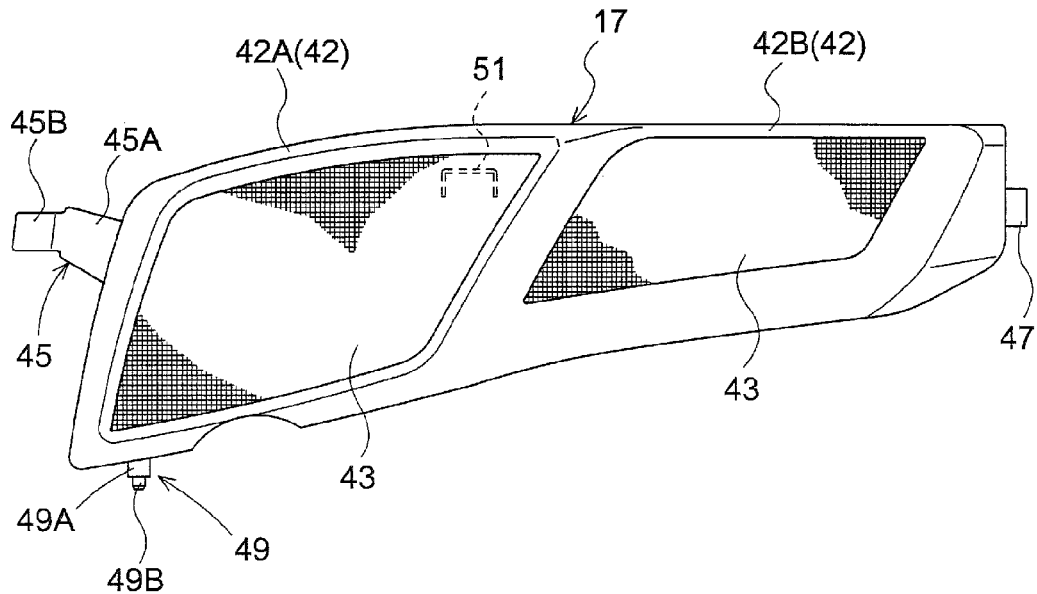
FIG. 4 is a side view showing a portion of a cover attachment structure and a cover.
Figure 5:
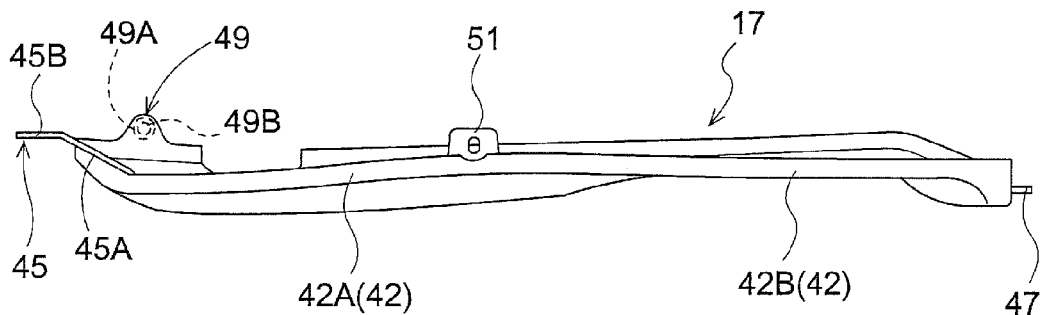
FIG. 5 is a plan view showing a portion of the cover attachment structure and the cover.
Figure 6:
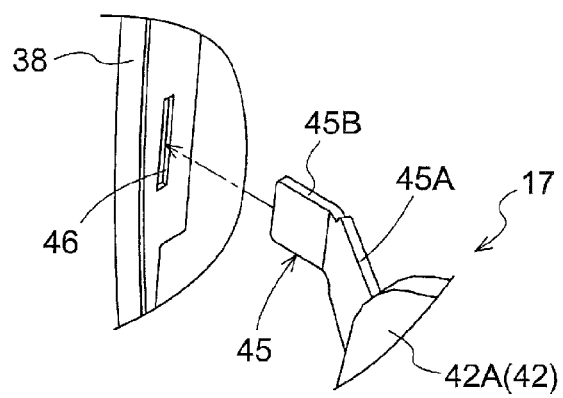
FIG. 6 is a perspective view showing a first female engagement portion and its surroundings.
Figure 7:
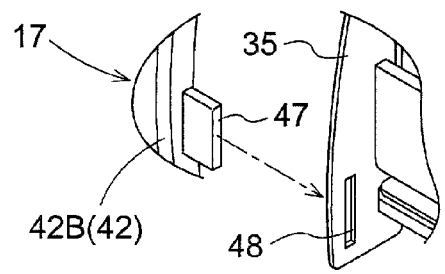
FIG. 7 is a side view showing a second female engagement portion and its surroundings.
Figure 8:
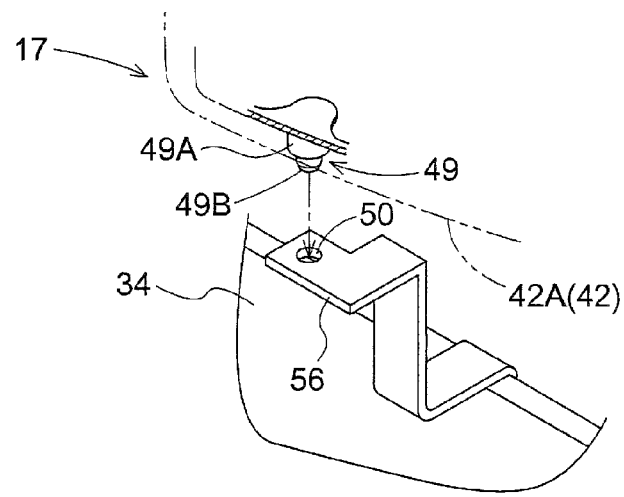
FIG. 8 is a side view showing a third male engagement portion and a third female engagement portion and their surroundings.
Figure 9:
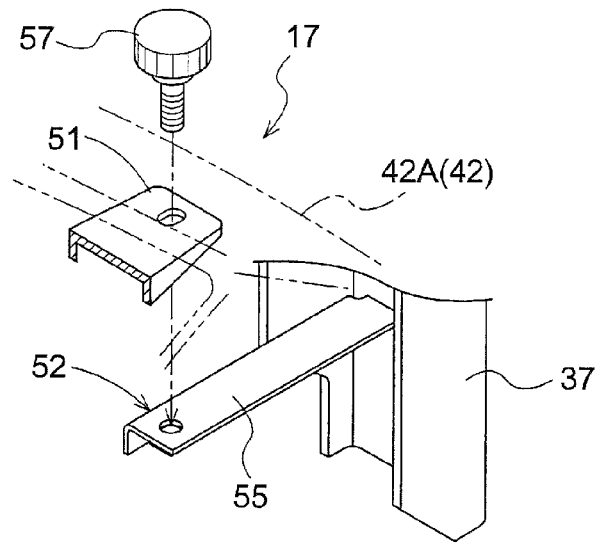
FIG. 9 is a perspective view showing a fixture portion and its surroundings.

As shown in FIGS. 1 and 2, the cover 17, which can be removably attached to the traveling machine assembly 14, is provided at the lower edge portion of the rear portion of the side portion 16C of the bonnet 16. The cover 17 is provided on each of the left and right sides of the traveling machine assembly 14. The cover 17, which is formed of, for example, a resin, can be removably attached to the traveling machine assembly 14 by the cover attachment structure 18. As shown in FIGS. 4 and 5, the cover 17 includes a main body portion 42 that becomes narrower from the front of the traveling machine assembly toward the rear of the traveling machine assembly. When the cover 17 is attached, the main body portion 42 is disposed along the lower edge portion of the rear portion of the side portion 16C of the bonnet 16, covering a lateral side of the drive unit 15. The main body portion 42 includes a front wide portion 42A, and a narrow portion 42B that is provided behind the wide portion 42A and is narrower than the wide portion 42A in the vertical direction. The main body portion 42 has circumferential portions that are provided around ventilation portions 43 and are in the shape of a rib protruding toward the inside of the traveling machine assembly 14 for reinforcement.

The main body portion 42 includes the two (front and rear) ventilation portions 43 that have a large number of ventilation pores for dissipating heat of the drive unit 15 to the outside of the traveling machine assembly 14. For example, air that is taken in by the action of the fan 31 or the like through the intake portion 40 in the front portion 16A of the bonnet 16 is used to cool the drive unit 15 before being emitted through the ventilation portions 43 of the covers 17.

The cover attachment structure 18 includes a first protrusion portion 45 (an example of a "first male engagement portion") provided on the cover 17, a first insertion hole 46 (an example of a "first female engagement portion") provided on the traveling machine assembly 14, a second protrusion portion 47 (an example of a "second male engagement portion") provided on the cover 17, a second insertion hole 48 (an example of a "second female engagement portion") provided on the traveling machine assembly 14, a lower protrusion portion 49 (an example of a "third male engagement portion") provided on the cover 17, and a positioning hole 50 (an example of a "third female engagement portion") provided on the traveling machine assembly 14.

As shown in FIGS. 2 to 5, the first protrusion portion 45 is provided at a front end portion of the main body portion 42 of the cover 17. The first protrusion portion 45 includes an inner extension portion 45A that extends from a front edge portion of the main body portion 42 diagonally inward and forward with respect to the traveling machine assembly, and a front extension portion 45B that is narrower than the inner extension portion 45A in the vertical direction and extends from a front end portion of the inner extension portion 45A forward with respect to the traveling machine assembly. The front extension portion 45B is located further inside than the second protrusion portion 47 in the transverse direction of the traveling machine assembly 14.

The second protrusion portion 47 is located at a rear end portion of the main body portion 42 of the cover 17. A longitudinal length of the second protrusion portion 47 is set to be shorter than that of the front extension portion 45B of the first protrusion portion 45. The second protrusion portion 47 and the first protrusion portion 45 are located at substantially the same height.

The lower protrusion portion 49 is formed to protrude from a lower edge portion of the main body portion 42 of the cover 17 downward with respect to the traveling machine assembly. The lower protrusion portion 49 includes a large-diameter portion 49A that extends downward from the main body portion 42, and a small-diameter portion 49B that extends downward from the large-diameter portion 49A and has a smaller diameter than that of the large-diameter portion 49A.

As shown in FIGS. 6 and 10A to 10D, the first insertion hole 46 is formed in each of plate portions leaning backward at one and the other lateral edge portions of the fan shroud 38 of the traveling machine assembly 14. The first insertion hole 46 is configured so that the first protrusion portion 45 can be inserted therethrough along the longitudinal direction of the traveling machine assembly. As shown in FIGS. 7 and 10A to 10D, the second insertion hole 48 is formed at each of one and the other end portions of lower portions of the partition frame 35 of the traveling machine assembly 14. The second insertion hole 48 is configured so that the second protrusion portion 47 can be inserted therethrough along the longitudinal direction of the traveling machine assembly.

As shown in FIGS. 8 and 10A to 10D, the positioning hole 50 is provided in a stay 56 that is provided, standing from the front axle frame 34 of the traveling machine assembly 14. The stay 56 is located behind a lower end portion of the fan shroud 38. The positioning hole 50 vertically penetrates a horizontal portion of the stay 56, whereby the lower protrusion portion 49 can be engaged with the positioning hole 50.

As shown in FIGS. 10A to 10D, when the front extension portion 45B of the first protrusion portion 45 is inserted into and engaged with the first insertion hole 46, the first insertion hole 46 limits movement of the front extension portion 45B of the first protrusion portion 45 in the transverse direction of the traveling machine assembly, and at the same time, the front extension portion 45B of the first protrusion portion 45 is permitted to move in the longitudinal direction of the traveling machine assembly. In other words, the front extension portion 45B of the first protrusion portion 45 and the first insertion hole 46 are configured to, when engaged together, permit the main body portion 42 to move in the longitudinal direction of the traveling machine assembly. When the first protrusion portion 45 is inserted into the first insertion hole 46 until the inner extension portion 45A makes contact with a rear end portion of the first insertion hole 46, a longitudinal gap occurs between the second protrusion portion 47 and the second insertion hole 48. Therefore, the second protrusion portion 47 and the second insertion hole 48 are positioned by swinging the main body portion 42, in the horizontal or vertical direction, around a point where the first protrusion portion 45 is engaged with the first insertion hole 46.

While the first protrusion portion 45 is engaged with the first insertion hole 46, the second protrusion portion 47 is inserted into and engaged with the second insertion hole 48. As a result, the second insertion hole 48 limits movement of the second protrusion portion 47 in the transverse direction of the traveling machine assembly 14, and at the same time, the second protrusion portion 47 is permitted to move the longitudinal direction of the traveling machine assembly 14. In other words, the second protrusion portion 47 and the second insertion hole 48 are configured to, when engaged together, permit the main body portion 42 to move in the longitudinal direction of the traveling machine assembly 14. Thus, when the first protrusion portion 45 is engaged with the first insertion hole 46 and the second protrusion portion 47 is engaged with the second insertion hole 48, the main body portion 42 is guided by the first insertion hole 46 and the second insertion hole 48 so that the main body portion 42 is permitted to move in the longitudinal direction of the traveling machine assembly 14 while movement of the main body portion 42 in the transverse direction of the traveling machine assembly is limited. While the first protrusion portion 45 is engaged with the first insertion hole 46 and the second protrusion portion 47 is engaged with the second insertion hole 48, the positioning hole 50 is positioned at the lower protrusion portion 49 by moving the main body portion 42 in the longitudinal direction of the traveling machine assembly while raising the main body portion 42 within a range permitted by the first insertion hole 46 and the second insertion hole 48.

Here, as shown in FIGS. 2 to 5, 6, and 7, the amount of movement of the main body portion 42 in the longitudinal direction of the traveling machine assembly that is permitted when the first protrusion portion 45 is engaged with the first insertion hole 46 is different from the amount of movement of the main body portion 42 in the longitudinal direction of the traveling machine assembly that is permitted when the second protrusion portion 47 is engaged with the second insertion hole 48. Specifically, a length of the first protrusion portion 45 in the longitudinal direction of the traveling machine assembly 14 is longer than that of the second protrusion portion 47. This clearly defines the following attachment procedure: the first protrusion portion 45 is inserted into the first insertion hole 46 before the second protrusion portion 47 is inserted into the second insertion hole 48. Also, while the first protrusion portion 45 is maintained engaged with the first insertion hole 46, the second protrusion portion 47 can be easily inserted into and engaged with the second insertion hole 48.

While the first protrusion portion 45 is engaged with the first insertion hole 46 and the second protrusion portion 47 is inserted into and engaged with the second insertion hole 48, the main body portion 42 is lowered so that the lower protrusion portion 49 is inserted into and engaged with the positioning hole 50, so that movement of the lower protrusion portion 49 in the longitudinal and transverse directions is limited. As a result, movement of the main body portion 42 in the longitudinal, transverse, and downward directions is limited, and therefore, the cover 17 is positioned by its own weight. In this case, a position where the lower protrusion portion 49 is engaged with the positioning hole 50 is set within a range that permits the main body portion 42 to move in the longitudinal direction of the traveling machine assembly 14 while the first protrusion portion 45 is engaged with the first insertion hole 46 and the second protrusion portion 47 is engaged with the second insertion hole 48.

As shown in FIGS. 6 and 10A to 10D, the first insertion hole 46 has an oblong hole shape that is longer in the vertical direction of the traveling machine assembly than it is wide. The first protrusion portion 45 is shorter than the first insertion hole 46 in the vertical direction of the traveling machine assembly. Therefore, when the first insertion hole 46 engaged with the first protrusion portion 45, a gap is formed between the first protrusion portion 45 and the first insertion hole 46 in the vertical direction of the traveling machine assembly. As shown in FIG. 7 and FIG. 10A to 10D, the second insertion hole 48 has an oblong hole shape that is longer in the vertical direction of the traveling machine assembly 14 than it is wide.

The second protrusion portion 47 is shorter than the second insertion hole 48 in the vertical direction of the traveling machine assembly 14. Therefore, when the second insertion hole 48 is engaged with the second protrusion portion 47, a gap is formed between the second protrusion portion 47 and the second insertion hole 48 in the vertical direction of the traveling machine assembly 14. Therefore, while the first protrusion portion 45 is engaged with the first insertion hole 46 and the second protrusion portion 47 is engaged with the second insertion hole 48, play can be secured that allows the main body portion 42 of the cover 17 to vibrate in the vertical direction of the traveling machine assembly 14.

With the above configuration, the cover 17 can be positioned on the traveling machine assembly 14. As shown in FIGS. 2, 4, 5, 9, and 10A to 10D, the cover attachment structure 18 may further include a fixture portion 51 and a fixation portion 52. The fixture portion 51 is provided at a point close to a middle of the main body portion 42 in the longitudinal direction of the traveling machine assembly. The fixture portion 51 includes a horizontal flat plate that protrudes inward from an inner surface of the front ventilation portion 43, and a vertical hole portion that is formed in the flat plate. The fixation portion 52 includes a vertical hole portion formed in a bracket 55 that protrudes toward the outside of the traveling machine assembly from the device support frame 37 that supports the exhaust treatment device 29 above the engine 26.

A procedure for attaching the cover 17 to the traveling machine assembly 14 will be described below.

Figure 10A:
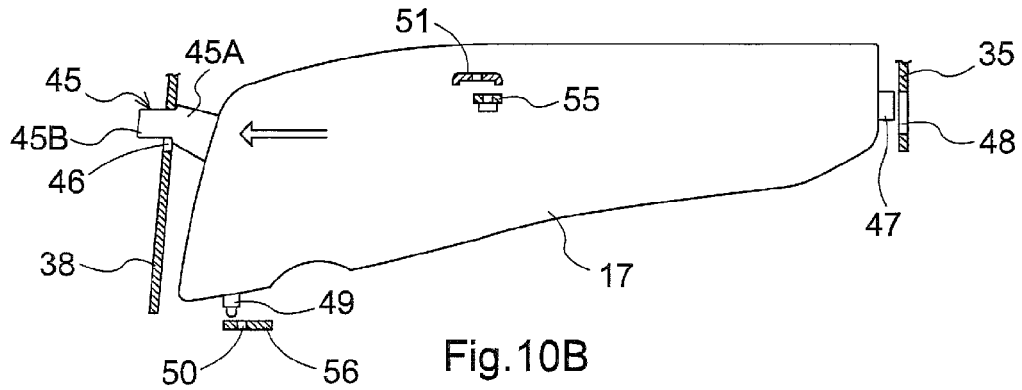
FIG. 10A is a diagram for describing a procedure for attaching the cover when a first male engagement portion is engaged with the first female engagement portion.

Initially, as shown in FIG. 10A, the main body portion 42 is moved in the forward direction of the traveling machine assembly so that the front extension portion 45B of the first protrusion portion 45 is inserted into and engaged with the first insertion hole 46. In this case, the front extension portion 45B of the first protrusion portion 45 is inserted into the first insertion hole 46 while the main body portion 42 is slightly raised. When the first protrusion portion 45 is inserted into the first insertion hole 46 until a rear end portion of the first insertion hole 46 makes contact with a front end portion of the inner extension portion 45A of the first protrusion portion 45, a gap is formed between the second protrusion portion 47 and the second insertion hole 48 in the longitudinal direction of the traveling machine assembly 14. In this case, the first insertion hole 46 is located further inside than the second insertion hole 48 in the transverse direction of the traveling machine assembly 14, and the front extension portion 45B of the first protrusion portion 45 is located further inside than the second protrusion portion 47 in the transverse direction of the traveling machine assembly 14. Therefore, the first protrusion portion 45 is easily inserted into and engaged with the first insertion hole 46.

Figure 10B:
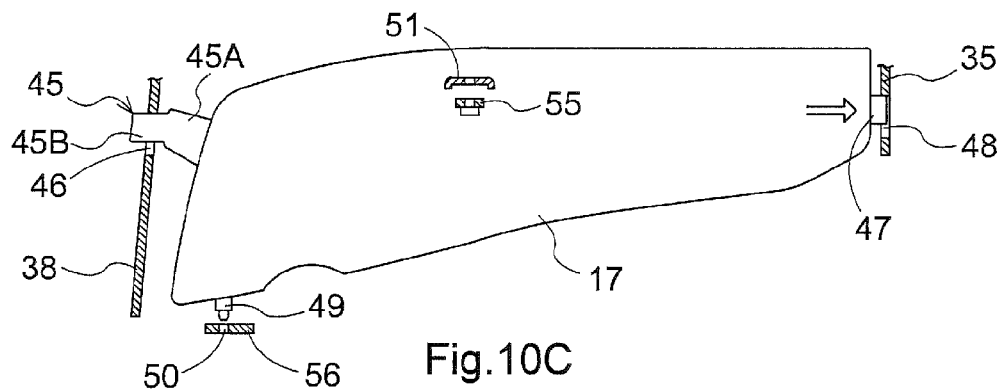
FIG. 10B is a diagram for describing a procedure for attaching the cover when a second male engagement portion is engaged with the second female engagement portion.

Next, as shown in FIG. 10B, while the first protrusion portion 45 is inserted into the first insertion hole 46, the main body portion 42 is slightly slid in a backward direction of the traveling machine assembly 14 so that the second protrusion portion 47 is inserted into and engaged with the second insertion hole 48. Thus, when the first protrusion portion 45 is engaged with the first insertion hole 46 and the second protrusion portion 47 is engaged with the second insertion hole 48, movement of the main body portion 42 in the transverse direction of the traveling machine assembly 14 is limited, and the main body portion 42 is permitted to move in the longitudinal direction of the traveling machine assembly 14 while play is provided in the vertical direction of the traveling machine assembly 14. As a result, the main body portion 42 of the cover 17 is positioned with respect to the traveling machine assembly 14 in the transverse direction of the traveling machine assembly 14.

Figure 10C:
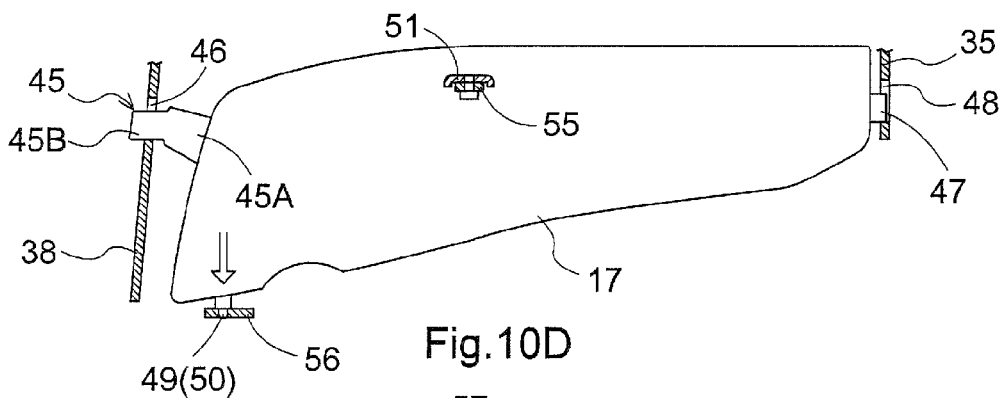
FIG. 10C is a diagram for describing a procedure for attaching the cover when the third male engagement portion is engaged with the third female engagement portion.

Thereafter, as shown in FIG. 10C, while the first protrusion portion 45 is engaged with the first insertion hole 46 and the second protrusion portion 47 is inserted into the second insertion hole 48, the main body portion 42 is slightly raised and slid in the longitudinal direction of the traveling machine assembly 14 so that the lower protrusion portion 49 is positioned at the positioning hole 50, and the main body portion 42 is moved in the downward direction of the traveling machine assembly 14 so that the lower protrusion portion 49 falls into the positioning hole 50, whereby the lower protrusion portion 49 is inserted into and engaged with the positioning hole 50. As a result, movement of the main body portion 42 of the cover 17 in the longitudinal and downward directions of the traveling machine assembly 14 is limited.

In this state, as shown in FIGS. 1 and 2, if the bonnet 16 is put into the closed position, movement of the main body portion 42 of the cover 17 in the upward direction of the traveling machine assembly 14 is limited by the lower edge portion of the side portion 16C of the bonnet 16. As a result, movement of the main body portion 42 in the transverse, longitudinal, and vertical directions of the traveling machine assembly 14 is limited, and therefore, the cover 17 can be prevented from dropping off the traveling machine assembly 14 as long as the bonnet 16 is in the closed position.

Thus, when the cover 17 is attached to the traveling machine assembly 14 by means of the cover attachment structure 18, play can be ensured between the first protrusion portion 45 and the first insertion hole 46 and between the second protrusion portion 47 and the second insertion hole 48 in the longitudinal and transverse directions of the traveling machine assembly 14. Therefore, when the traveling machine assembly 14 vibrates vertically due to traveling or the like, some vertical play can be ensured between the first protrusion portion 45 and the first insertion hole 46 and between the second protrusion portion 47 and the second insertion hole 48.

Figure 10D:
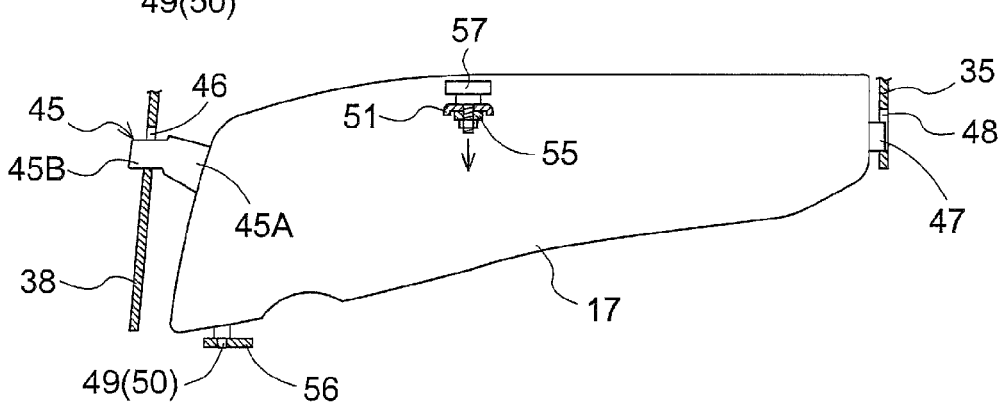
FIG. 10D is a diagram for describing a procedure for attaching the cover when the fixture portion is engaged with a fixation portion.

Note that when the lower protrusion portion 49 is engaged with the positioning hole 50, as shown in FIG. 10D the fixture portion 51 is positioned at the fixation portion 52. By engaging and fixing the fixture portion 51 with and to the fixation portion 52 by fastening a fastening member, such as a knob bolt 57 or the like, from above, the main body portion 42 of the cover 17 can be completely fixed to the traveling machine assembly 14.

Blocking Structure

Figure 11:
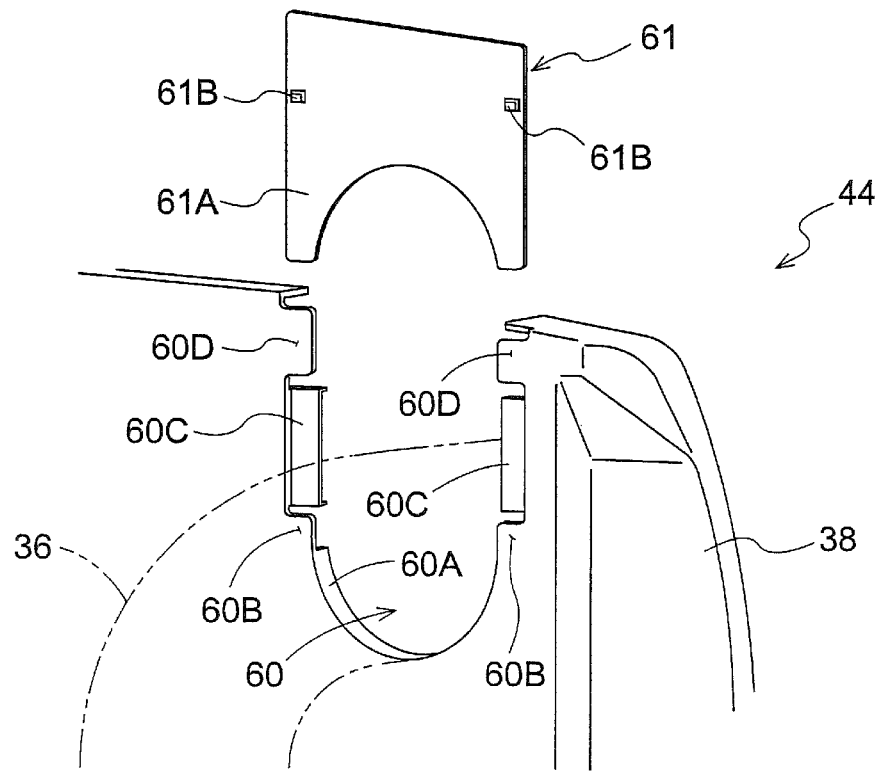
FIG. 11 is a perspective view showing a blocking structure for a fan shroud when a blocking plate is removed.
Figure 12:
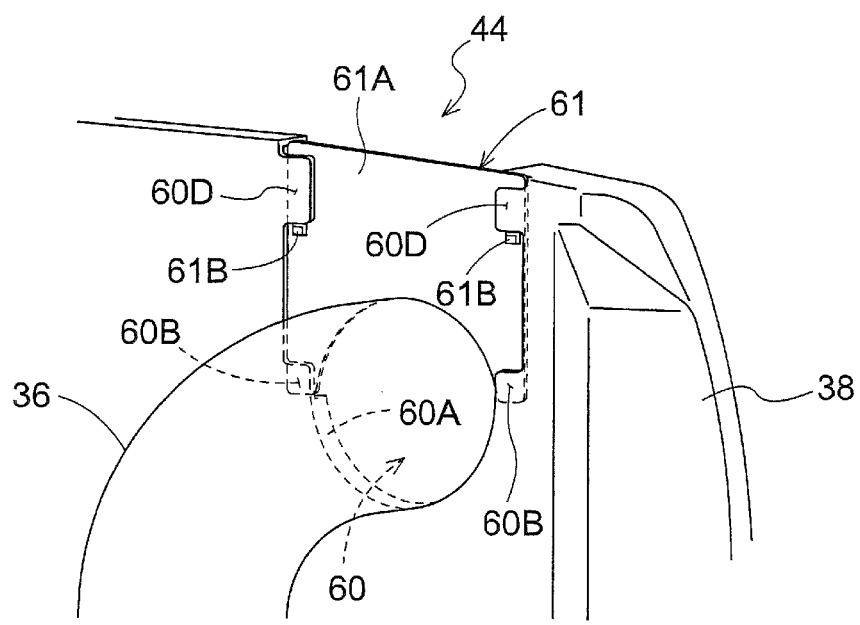
FIG. 12 is a perspective view showing the blocking structure for the fan shroud when the blocking plate is attached.

As shown in FIGS. 11 and 12, the blocking structure 44 includes an insertion portion 60 provided in the fan shroud 38, and a blocking plate 61 that is engaged with the insertion portion 60 from above the insertion portion 60. The insertion portion 60 has a shape corresponding to a lower half portion of the inlet hose 36. Specifically, when the inlet hose 36 has a circular cross-section, the insertion portion 60 has a semicircular shape that receives the lower semicircular portion of the inlet hose 36. The insertion portion 60 includes a support portion 60A, lower limiting portions 60B, middle limiting portions 60C, and upper limiting portions 60D. The lower limiting portion 60B, the middle limiting portion 60C, and the upper limiting portion 60D are arranged vertically and staggered in the longitudinal direction so that the blocking plate 61 can be inserted between the lower and upper limiting portions 60B and 60D and the middle limiting portion 60C.

The support portion 60A receives and supports the engaged blocking plate 61 from below. The lower limiting portions 60B are located above and adjacent to the support portions 60A, and are configured to limit forward movement of both lateral end portions of a front surface of an upper portion of the blocking plate 61. The middle limiting portions 60C are located above and adjacent to the lower limiting portions 60B, and are configured to limit backward movement of both lateral end portions of a rear surface of a vertically middle portion of the blocking plate 61. The upper limiting portions 60D are located above and adjacent to the middle limiting portions 60C, and are configured to limit backward movement of both lateral end portions of a front surface of an upper portion of the blocking plate 61 and upward movement of protruding portions 61B of the blocking plate 61. Thus, the insertion portion 60 nips the blocking plate 61 in a staggered manner in the longitudinal direction to prevent the blocking plate 61 from moving in the longitudinal direction.

The blocking plate 61 is formed of, for example, a flexible resin material. The blocking plate 61 includes a plate portion 61A, and the protruding portions 61B that are formed on respective lateral end portions of the plate portion 61A. The plate portion 61A has a quadrangular shape whose lower end portion is cut into an upper semicircular shape corresponding to an external shape of an upper portion of the inlet hose 36. The protruding portions 61B, which are fixed to the plate portion 61A, are located to protrude from the covered surface of the plate portion 61A in the longitudinal direction of the traveling machine assembly 14.

The blocking plate 61 is attached to the insertion portion 60 as follows. The plate portion 61A is bent. The protruding portions 61B are positioned below the upper limiting portions 60D. Thereafter, the plate portion 61A is released. As a result, movement of the blocking plate 61 in the longitudinal, vertical, and transverse directions is limited by the insertion portion 60, whereby the engine room ER and the front space FR can be completely partitioned from each other. Thus, the protruding portions 61B make contact with or abut the upper limiting portions 60D, whereby the blocking plate 61 is prevented from falling off and vibrating. Therefore, the step of filling the gap between the fan shroud 38 and the inlet hose 36 using a sponge or the like is no longer required, as in the conventional art, and the engine room ER and the front space FR can be more efficiently partitioned from each other using a simple structure.

Specific Structure of Exhaust Pipe

Figure 13:
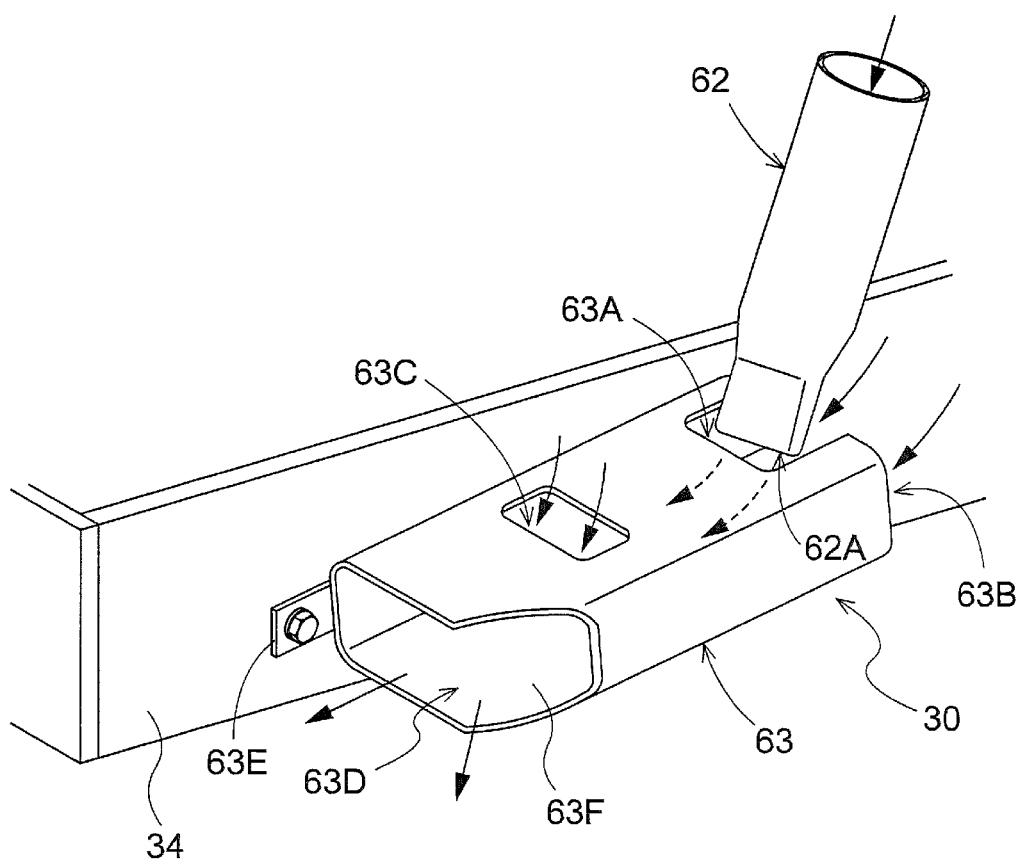
FIG. 13 is a perspective view showing an exhaust pipe and its surroundings.

As shown in FIGS. 2 and 13, the exhaust pipe 30 includes a first emission pipe 62 linked to the engine 26, and a second emission pipe 63 linked to the first emission pipe 62. One end of the first emission pipe 62 is linked to the engine 26. The first emission pipe 62 extends downward from the one end to reach a bending portion, and extends from the bending portion diagonally forward with respect to the traveling machine assembly 14 to reach the other end. The cross-sectional area of the first emission pipe 62 is narrowed at an emission opening 62A. As a result, the flow rate of exhaust gas increases in the vicinity of the emission opening 62A, whereby negative pressure can be increased in the vicinity of the emission opening 62A.

The second emission pipe 63 functions as an exhaust guiding pipe that guides exhaust gas emitted from the first emission pipe 62. The second emission pipe 63 is attached and fixed to a side portion of the front axle frame 34 using a bolt with a bracket 63E extending in the longitudinal direction of the traveling machine assembly 14 being interposed therebetween. The second emission pipe 63 has a generally rectangular tube shape. The second emission pipe 63 has a first upper opening 63A provided in a rear upper surface thereof, a rear opening 63B (an upstream-end opening as used herein) provided in a rear surface thereof, a second upper opening 63C provided in an upper surface thereof in front of the first upper opening 63A, and an exhaust opening 63D provided in a front surface thereof. Exhaust gas is emitted from the emission opening 62A of the first emission pipe 62 to the first upper opening 63A.

The emission opening 62A is formed by narrowing the cross-sectional area of the first emission pipe 62, whereby the flow rate of exhaust gas is increased. Therefore, negative pressure that is greater than that of the surrounding of the emission opening 62A can be generated, whereby the amount of air introduced through the surrounding of the first upper opening 63A is increased so that the exhaust temperature can be effectively reduced. In addition, air can be introduced not only through the first upper opening 63A but also through the rear opening 63B, whereby the amount of the introduced air can be increased. Thus, the cross-sectional area of the introduction opening of the second emission pipe 63 through which air is introduced is increased, whereby the exhaust temperature is effectively reduced. The upper opening 63A is a cut portion continuous to an upper portion of the rear opening 63B of the second exhaust pipe 63. Therefore, since the rear opening 63B and the upper opening 63A are continuous, there is not resistance that inhibits introduction of air therebetween, and therefore, air can be smoothly introduced.

The second exhaust pipe 63 is provided in a sloped position, leaning backward. Therefore, exhaust gas from the emission opening 62A flows into the second exhaust pipe 63 diagonally forward and downward. As a result, exhaust gas from the emission opening 62A flows into the second exhaust pipe 63 with as low resistance as possible, whereby the occurrence of a greater negative pressure is ensured. Moreover, since the cross-sectional area of the exhaust opening 63D is larger than that of the air introduction opening of the second exhaust pipe 63, a mixture of exhaust gas and air flows smoothly in the second exhaust pipe 63, whereby the mixture gas having a reduced exhaust temperature can be reliably emitted to the outside. The exhaust opening 63D is extended diagonally and laterally by a cut portion 63F, whereby exhaust gas from the exhaust opening 63D is emitted diagonally sideways in a distributed manner instead of being emitted only forward in a concentrated manner.

With the exhaust pipe 30, high-temperature exhaust gas is emitted from the exhaust treatment device 29 to the first emission pipe 62, and is introduced through the emission opening 62A of the first emission pipe 62 to the first upper opening 63A of the second emission pipe 63. As a result, a negative pressure occurs in the vicinity of the emission opening 62A, so that air outside the traveling machine assembly 14 flows through the rear opening 63B of the second emission pipe 63 into the second emission pipe 63. The entering air is mixed into the exhaust gas introduced through the first upper opening 63A, whereby the temperature of the exhaust gas can be reduced. Moreover, when exhaust gas flows in the second emission pipe 63, air outside the traveling machine assembly 14 flows through the second upper opening 63C into the second emission pipe 63, and the entering air is mixed into the exhaust gas having a reduced temperature, whereby the temperature of the exhaust gas can be further reduced. As a result, exhaust gas having reduced temperature can be emitted to the outside of the traveling machine assembly 14.

Variations of First Embodiment (1) In the above embodiment, the first protrusion portion 45 is longer than the second protrusion portion 47. Conversely, the second protrusion portion 47 may be longer than the first protrusion portion 45.

(2) In the above embodiment, the first protrusion portion 45 is exemplified as a first male engagement portion, the second protrusion portion 47 is exemplified as a second male engagement portion, the lower protrusion portion 49 is exemplified as a third male engagement portion, the first insertion hole 46 is exemplified as a first female engagement portion, the second insertion hole 48 is exemplified as a second female engagement portion, and the positioning hole 50 is exemplified as a third female engagement portion. These protruding portions are engaged with these insertion holes. The present invention is not limited to this. Alternatively, for example, the first, second, and third male engagement portions may be a hook-like member, and the first, second, and third female engagement portions may be a hole-like member to which the hook-like member can be hooked.

(3) In the above embodiment, the fixture portion 51 and the fixation portion 52 are provided. Since the lower end portion of the side portion 16C of the bonnet 16 in the closed position limits movement of the cover 17 in the upward direction of the traveling machine assembly 14, the fixture portion 51 and the fixation portion 52 may not be provided.

(4) In the above embodiment, the fan shroud 38 is exemplified as an accessory for the engine 26 in the drive unit 15. The present invention is not limited to this. Alternatively, for example, other accessories, such as an engine frame that supports the engine 26 and the like, may be provided.

(5) In the above embodiment, the tractor 11 is exemplified as a working vehicle. The present invention is not limited to this. Alternatively, the present invention is applicable to other working vehicles, such as a combine harvester, a rice transplanter, and the like.

Second Embodiment

Another example of the present invention will be described with reference to the drawings.

Figure 14:
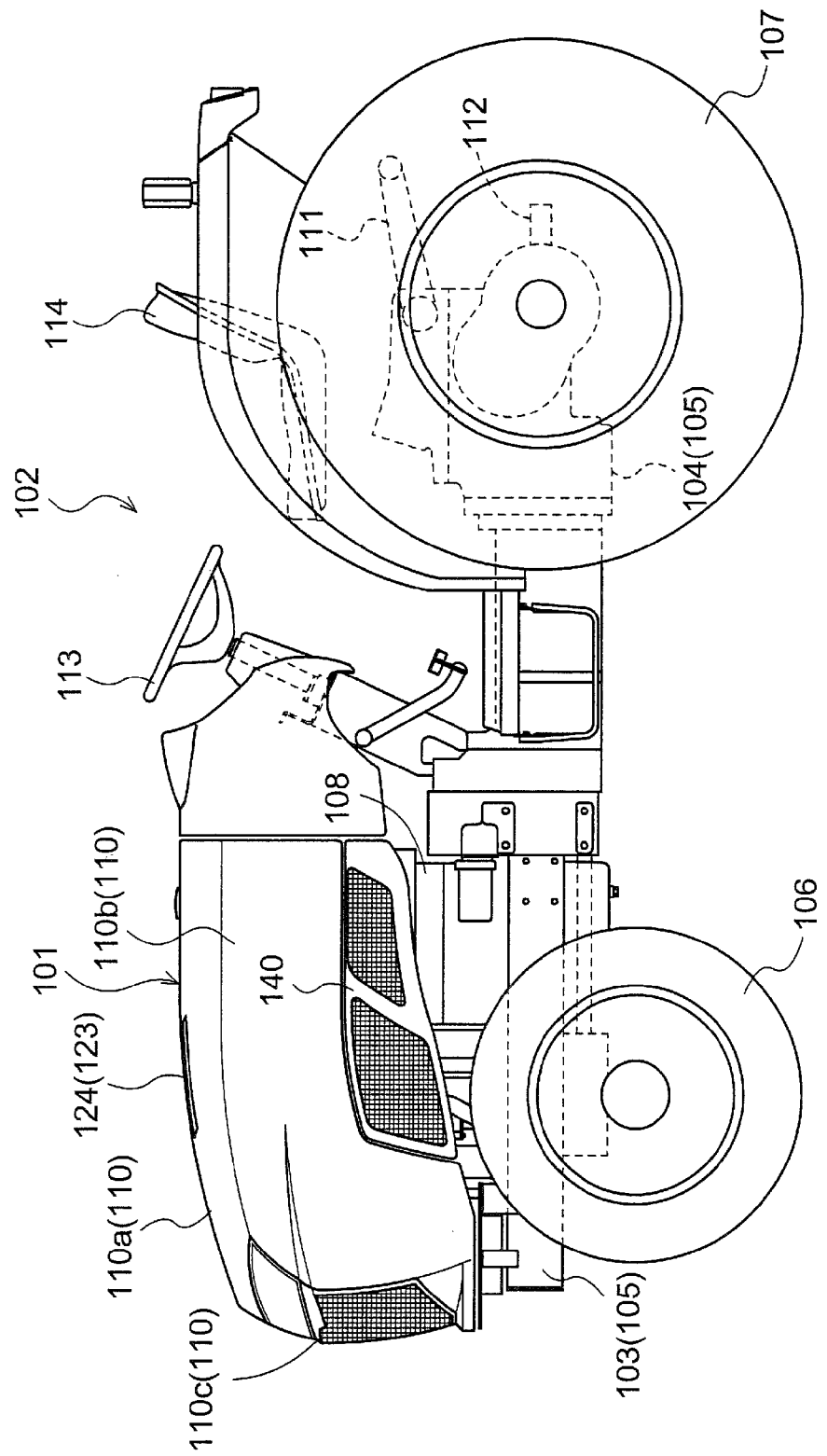
FIG. 14 is a side view showing an entire tractor.

FIG. 14 shows an entire side surface of a tractor that is an example working vehicle according to the present invention.

This tractor includes a drive unit 101 that is provided in a front portion of the vehicle body, and a maneuvering unit 102 that is provided in a middle portion of the vehicle body behind the drive unit 101. An engine mounting frame 103, a clutch housing (not shown), and a mission case 104 are integrally linked together to form a vehicle body frame 105. The drive unit 101 is mounted on the engine mounting frame 103. The vehicle body frame 105 is supported by a pair of left and right front wheels 106 and a pair of left and right rear wheels 107.

Figure 15:
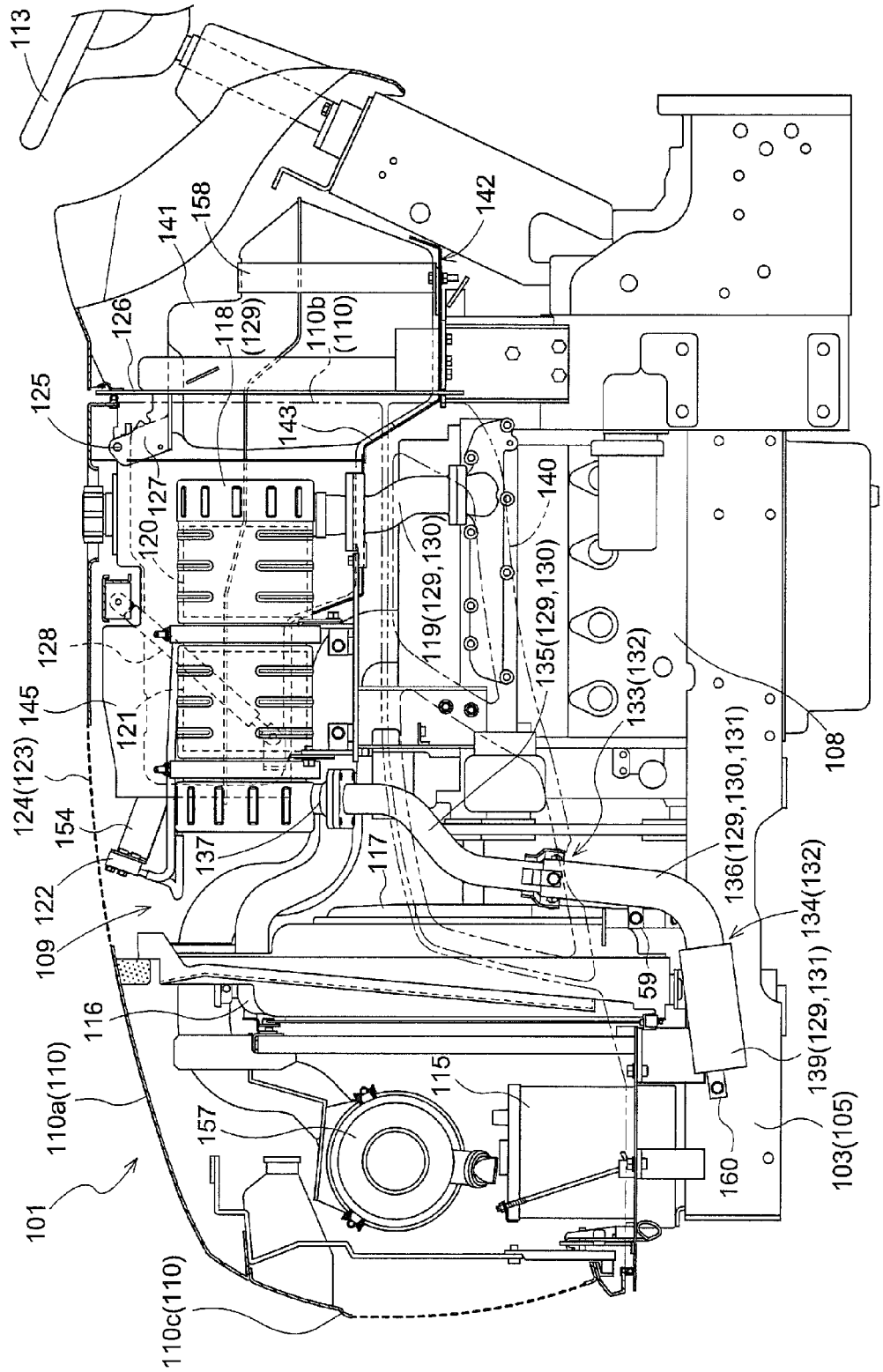
FIG. 15 is a side view showing a drive unit.

As shown in FIGS. 14 and 15, in the drive unit 101, an engine 108 that is a diesel engine is provided on the engine mounting frame 103 and supported by an anti-vibration material (not shown) that reduces or prevents vibration of the engine 108. A bonnet 110 is provided that forms an engine room 109 for accommodating the engine 108. The bonnet 110 is allowed to swing up and down into a closed position in which the engine room 109 is formed inside the bonnet 110 and an open position in which the engine room 109 is exposed.

Power is transmitted from the engine 108, via an automotive transmission system including an automotive transmission (not shown) and the like included in the mission case 104 that also serves as a frame, to the front wheels 106 and the rear wheels 107, i.e., a four-wheel drive tractor is configured. The maneuvering unit 102 includes a steering wheel 113, a driver's seat 114, and the like.

Referring back to FIG. 14, a pair of left and right lift arms 111 that are driven to swing in the vertical direction by action of a hydraulic lift cylinder (not shown) that is included in a rear upper portion of the mission case 104, a power extraction shaft 112 that allows engine power to be extracted to the outside, and the like are provided behind the mission case 104. Power is transmitted from the engine 108 to the power extraction shaft 112 via a working transmission system including a working transmission (not shown), a working clutch (not shown), and the like, which is different from the automotive transmission system included in the mission case 104. A linkage mechanism (not shown) that is linked to a rear portion of the mission case 104 in a manner that allows the linkage mechanism to move up and down is linked to the left and right lift arms 111. A transmission shaft for transmitting power to a working device (not shown), such as a rotary tillage device or the like, which is linked to the linkage mechanism, is connected to the power extraction shaft 112.

Figure 16:
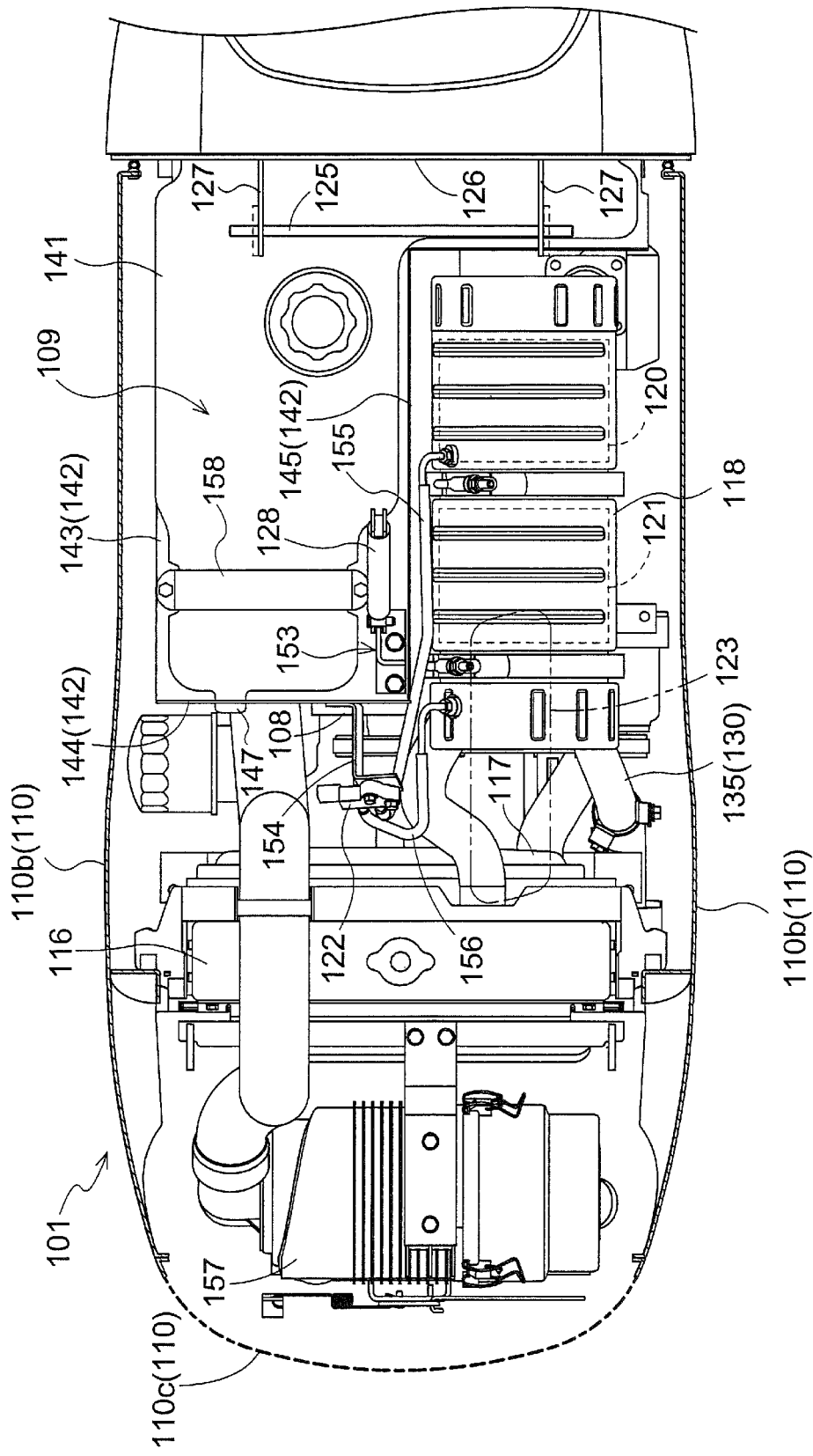
FIG. 16 is a plan view showing the drive unit.

As shown in FIGS. 15 and 16, the engine room 109 includes a battery 115, a radiator 116, a cooling fan 117 that blows air in the backward direction of the traveling machine assembly, and the engine 108, which are arranged sequentially from a front side in the longitudinal direction of the traveling machine assembly. The engine room 109 also includes an engine air cleaner 157 that is provided above the battery 115, and an exhaust cleaning device 118 with a muffler function that is provided above the engine 108 and accommodates a DOC 120 (diesel oxidation catalyst), a DPF 121 (diesel particulate filter), and the like. The exhaust cleaning device 118 is oriented so that a longitudinal direction thereof corresponds to the longitudinal direction of the traveling machine assembly. A fuel tank 141 is provided above the engine 108, extending along a lateral side portion of the exhaust cleaning device 118 and a rear side of the engine 108.

Bonnet

The bonnet 110 that forms the engine room 109 includes an upper panel 110a, left and right side panels 110b in the transverse direction of the traveling machine assembly, and a front panel 110c, and has an open bottom and an open rear. The upper panel 110a, the left and right side panels 110b, and the front panel 110c are formed as an integral panel member. This panel member forms the bonnet 110.

The upper panel 110a is elongated in the longitudinal direction of the traveling machine assembly to cover an upper portion of the drive unit 101. The upper panel 110a includes an opening 123 (a portion enclosed by a dash-dot line in FIG. 16) through which air in the engine room 109 can be emitted to the outside, at a position corresponding to an upper portion of the exhaust cleaning device 118. The opening 123 is located at a position corresponding to an upper portion of a front portion (a portion through which exhaust gas is emitted) of the exhaust cleaning device 118. The opening 123 includes a porous member 124 having a large number of pores, to prevent foreign matter from entering the engine room 109 from the outside while permitting air to be emitted from the engine room 109 to the outside. Each side panel 110b has an indentation so that a rear portion thereof is further up than a front portion thereof. At the upward indentation, another side panel 140 separate from the bonnet 110 is provided. The side panel 140 includes a porous portion having a large number of pores, which allows air in the engine room 109 to be emitted to the outside.

The bonnet 110 is supported by a swing shaft 125 that is provided at a rear end portion thereof, extending in the transverse direction of the traveling machine assembly, in a manner that allows the bonnet 110 to swing up and down around the swing shaft 125 as a pivot. The swing shaft 125 is supported by a pair of left and right support members 127 that extend in the forward direction of the traveling machine assembly from a partition member 126 that partitions the engine room 109 from a space behind the engine room 109. The partition member 126 is formed in the shape of a plate having a width in both of the vertical and transverse directions of the traveling machine assembly, and is located close to a rear end portion of the bonnet 110 in the longitudinal direction of the traveling machine assembly.

The bonnet 110 is swung and biased upward by a biasing member 128 that is provided between the upper panel 110a and the traveling machine assembly. The biasing force of the biasing member 128 makes it easier for a user to swing the bonnet 110 up from the closed position to the open position.

Exhaust Cleaning Device

The exhaust cleaning device 118 is linked to an exhaust pipe 119 of the engine 108, and is configured to clean exhaust gas flowing through the exhaust pipe 119. The exhaust cleaning device 118 includes a DOC 120 and a DPF 121 that are arranged sequentially from an upstream side in a direction in which the exhaust gas flows. The exhaust cleaning device 118 cleans exhaust gas supplied from a rear side of the traveling machine assembly, and emits the cleaned exhaust gas to a front side of the traveling machine assembly. The exhaust cleaning device 118 traps fine particulate substance contained in exhaust gas from the engine 108 using the DPF 121, and oxidizes and burns unburned fuel contained in the exhaust gas using the DOC 120 to increase the exhaust temperature, thereby burning the fine particulate substance trapped by the DPF 121 to restore the DPF 121. In order to determine the timing of performing the restoration process, a differential pressure sensor 122 is provided that detects a differential pressure between an upstream portion and a downstream portion of the DPF 121. A controller (not shown) for controlling the exhaust cleaning device 118 is configured to determine whether or not the restoration process is required (e.g., whether or not the DPF 121 is clogged, etc.) based on detection information of the differential pressure sensor 122, and perform the restoration process with appropriate timing.

Exhaust Path

An exhaust path 129 is provided through which exhaust gas is emitted from the engine 108 to the outside. The exhaust cleaning device 118 is provided at an intermediate point of the exhaust path 129. The exhaust path 129 includes an inner flow path portion 130 provided in the engine room 109, and an external flow path portion 131 provided outside the engine room 109. The inner flow path portion 130 is located upstream of the external flow path portion 131 in a direction in which exhaust gas flows. The exhaust pipe 119 through which exhaust gas is introduced from the engine 108 into the exhaust cleaning device 118 is included in the inner flow path portion 130. In order to decrease the exhaust temperature of exhaust gas cleaned by the exhaust cleaning device 118, the exhaust path 129 includes an outside air introduction portion 132 through which outside air is introduced at the intermediate point so that the outside air is mixed into the exhaust gas.

As the outside air introduction portion 132, provided are a first outside air introduction portion 133 that is provided in the inner flow path portion 130 of the exhaust path 129 and through which air in the engine room 109 is introduced as outside air, and a second outside air introduction portion 134 that is provided in the external flow path portion 131 of the exhaust path 129 and through which air outside the engine room 109 is introduced as outside air.

First Outside Air Introduction Portion

Figure 17:
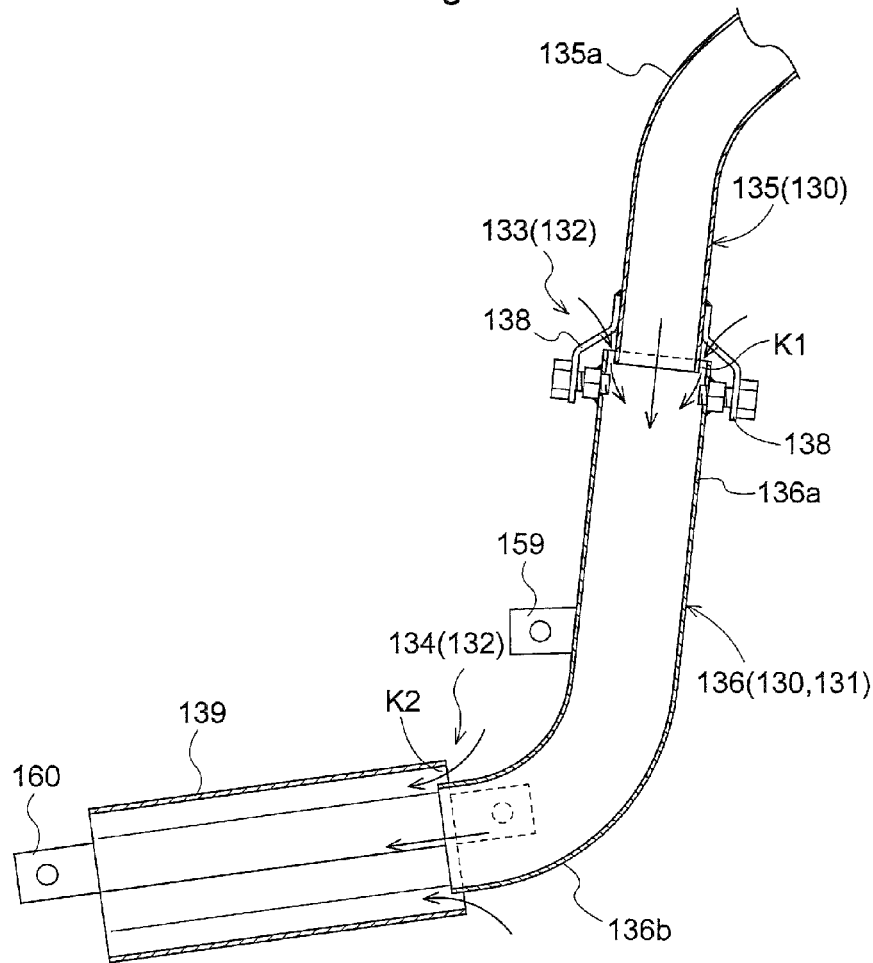
FIG. 17 is a cross-sectional view showing a main portion of an exhaust path.
Figure 18A:
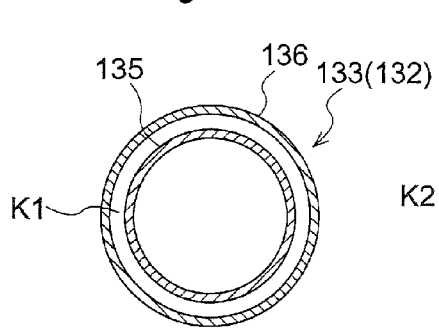
FIG. 18A is a cross-sectional view showing an outside air introduction portion.

As shown in FIGS. 15, 17, and 18A, the first outside air introduction portion 133 includes an upstream flow pipe 135 (corresponding to a first flow pipe) and a middle flow pipe 136 (corresponding to a second flow pipe) having a larger flow path cross-sectional area than that of the upstream flow pipe 135. In the first outside air introduction portion 133, a downstream end portion of the upstream flow pipe 135 and an upstream end portion of the middle flow pipe 136 form a double-pipe structure in which the upstream flow pipe 135 is located inside the middle flow pipe 136 with a gap K1 being interposed between the upstream flow pipe 135 and the middle flow pipe 136.

The upstream flow pipe 135 is linked to an emission portion 137 of the exhaust cleaning device 118. The upstream flow pipe 135 has a curved portion 135a that is curved forward and is located at an intermediate point of the upstream flow pipe 135. The upstream flow pipe 135 extends from top to bottom. The middle flow pipe 136 includes an upstream portion 136a extending from top to bottom, and a downstream portion 136b that is continuous to the upstream portion 136a and is curved toward the front of the traveling machine assembly so that the flow direction of exhaust gas is changed from the vertical direction to the longitudinal direction of the traveling machine assembly. The upstream flow pipe 135, and from the upstream end portion to the intermediate point of the middle flow pipe 136, constitute the inner flow path portion 130. The upstream flow pipe 135 and the middle flow pipe 136 both have a circular flow path cross-section. The middle flow pipe 136 has a larger inner diameter than that of the upstream flow pipe 135, and therefore, the upstream flow pipe 135 and the middle flow pipe 136 have different flow path cross-sectional areas, i.e., have a predetermined order of magnitude. The middle flow pipe 136 is fixed to and supported by the upstream flow pipe 135 with a linkage member 138 linking the upstream flow pipe 135 and the middle flow pipe 136. There are a plurality of the linkage members 138. The linkage members 138 are arranged in a circumferential direction of the upstream flow pipe 135 and the middle flow pipe 136 with spaces (gaps) through which outside air flows, whereby the flow of outside air through the gap K1 between the upstream flow pipe 135 and the middle flow pipe 136 is as little interfered with as possible. The middle flow pipe 136 is also linked to a machine assembly linkage member 159 linked to the traveling machine assembly.

The first outside air introduction portion 133 allows air in the engine room 109 to be introduced into the middle flow pipe 136 through the gap K1 between the upstream flow pipe 135 and the middle flow pipe 136 by an ejector action of the inflow of exhaust gas from the upstream flow pipe 135 to the middle flow pipe 136, whereby the air is mixed into the exhaust gas, resulting in a reduction in the exhaust temperature of the exhaust gas. The gap K1 is formed over an entire circumference in the circumferential direction of the upstream flow pipe 135, and has the same width in the radial direction of the upstream flow pipe 135. The first outside air introduction portion 133 is provided behind the cooling fan 117, and is configured to allow air blown by the cooling fan 117 toward the rear of the traveling machine assembly to be actively introduced as outside air. The first outside air introduction portion 133 is located adjacent to the porous portion of the side panel 140 in the transverse direction of the traveling machine assembly. Therefore, air having relatively low temperature that is emitted from the porous portion of the side panel 140 to the outside of the engine room 109 is easily introduced as outside air at the first outside air introduction portion 133, whereby the exhaust temperature is easily reduced.

Second Outside Air Introduction Portion

Figure 18B:
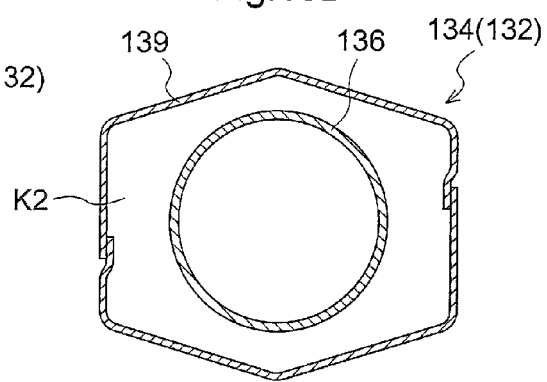
FIG. 18B is a cross-sectional view showing the outside air introduction portion.

As shown in FIGS. 15, 17, and 18B, the second outside air introduction portion 134 includes the middle flow pipe 136 (corresponding to a third flow pipe), and a downstream flow pipe 139 (corresponding to a fourth flow pipe) having a larger flow path cross-sectional area than that of the middle flow pipe 136. In the second outside air introduction portion 134, a downstream end portion of the middle flow pipe 136 and an upstream end portion of the downstream flow pipe 139 form a double-pipe structure in which the middle flow pipe 136 is located inside the downstream flow pipe 139 with a gap K2 being interposed between the middle flow pipe 136 and the downstream flow pipe 139. In this embodiment, the single middle flow pipe 136 serves as both of the second and third flow pipes as defined in the appended claims.

The downstream flow pipe 139 is fixed to and supported by a side portion of the engine mounting frame 103 via a machine assembly linkage member 160. The downstream flow pipe 139 is formed of two angular C-shaped members to have a polygonal (e.g., hexagonal) flow path cross-section. From the intermediate point to the downstream end portion of the middle flow pipe 136, and the downstream flow pipe 139, constitute the external flow path portion 131. The second outside air introduction portion 134 is located at a lateral side portion of the engine mounting frame 103 below the bonnet 110. The second outside air introduction portion 134 allows air outside the engine room 109 to be introduced into the downstream flow pipe 139 through the gap K2 between the middle flow pipe 136 and the downstream flow pipe 139 by an ejector action of the inflow of exhaust gas from the middle flow pipe 136 to the downstream flow pipe 139, whereby the air is mixed into the exhaust gas, resulting in a reduction in the exhaust temperature of the exhaust gas. The gap K2 is formed over an entire circumference in the circumferential direction of the middle flow pipe 136. A width of the gap K2 in the radial direction of the middle flow pipe 136 is larger in the transverse direction of the traveling machine assembly than in the vertical direction. Therefore, a larger amount of outside air can be introduced in the transverse direction of the traveling machine assembly.

Here, the gap K2 between the middle flow pipe 136 and the downstream flow pipe 139 in the second outside air introduction portion 134 has a larger cross-sectional area than that of the gap K1 between the upstream flow pipe 135 and the middle flow pipe 136 in the first outside air introduction portion 133. Therefore, the second outside air introduction portion 134 allows for introduction of a larger amount of outside air than that of the first outside air introduction portion 133. Thus, a large amount of outside air is introduced into the exhaust gas whose exhaust temperature has been reduced by the first outside air introduction portion 133, whereby the exhaust temperature can be effectively reduced. Thus, the exhaust gas having reduced exhaust temperature flows through the downstream flow pipe 139 to be emitted toward the front side of the traveling machine assembly.

The downstream flow pipe 139 has a shorter length than those of the upstream flow pipe 135 and the middle flow pipe 136, and therefore, the length of the external flow path portion 131 in the exhaust path 129 can be reduced to the extent possible. As a result, even in the limited space of the lateral side portion of the engine mounting frame 103, the exhaust temperature can be effectively reduced while an appropriate arrangement is provided by avoiding interference with other members.

Fuel Tank

Figure 19:
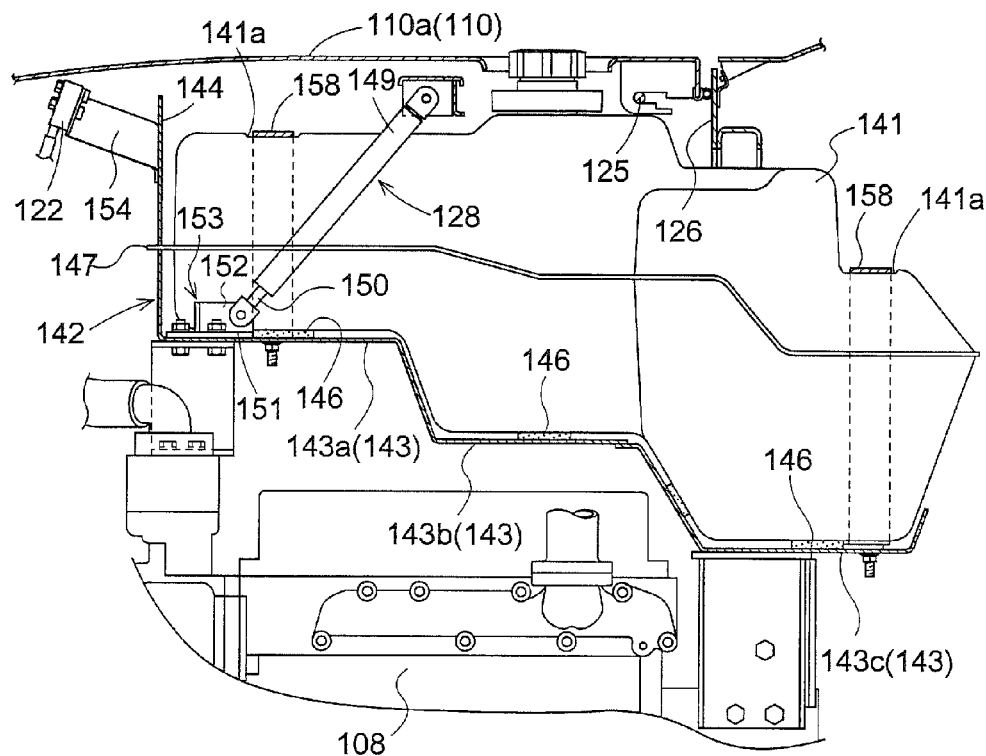
FIG. 19 is a cross-sectional side view showing a main portion of the drive unit.
Figure 20:
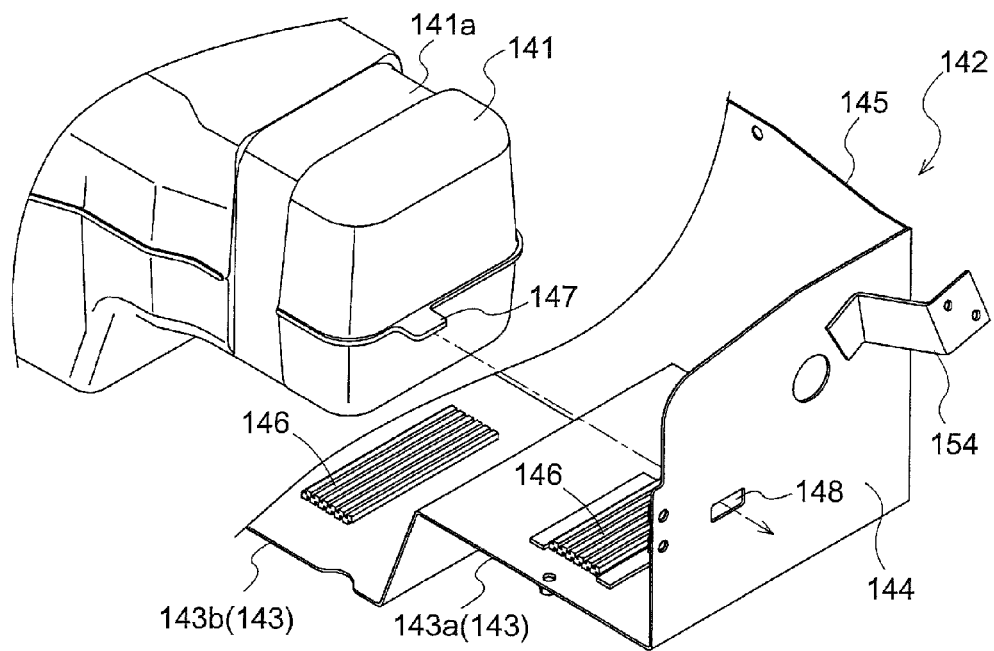
FIG. 20 is a perspective view showing a main portion of a fuel tank.

As shown in FIGS. 16, 19, and 20, the fuel tank 141 has a narrower front portion and a wider rear portion, i.e., is formed in an L-shape. The fuel tank 141 is supported by a fuel tank support member 142. The fuel tank support member 142 includes a bottom portion 143 on which a bottom portion of the fuel tank 141 is mounted and supported, a front wall portion 144 that is located close to a front end portion of the fuel tank 141, and a lateral wall portion 145 that is located close to a left lateral side portion of the fuel tank 141.

As shown in FIG. 19, the bottom portion 143 includes three plate-like members at different levels, i.e., a front end portion 143a located at the highest level, a middle portion 143b located at the second highest level with a riser-like portion being interposed between the front end portion 143a and the middle portion 143b, and a rear end portion 143c located at the lowest level with a riser-like portion being interposed between the middle portion 143b and the rear end portion 143c. The bottom portion of the fuel tank 141 is mounted and supported on the bottom portion 143 with an elastic support member 146 being interposed between the bottom portion of the fuel tank 141 and the bottom portion 143. A movement limiting member 158 is provided that is fitted into a groove portion 141a formed in an external circumferential portion of the fuel tank 141 in the transverse direction of the traveling machine assembly to limit movement of the fuel tank 141. Both end portions of the movement limiting member 158 can be fastened to the bottom portion 143.

As shown in FIG. 20, the front wall portion 144 is formed in the shape of a plate that extends upward from a front end portion of the bottom portion 143 to cover a front surface portion of the fuel tank 141. The front wall portion 144 includes a female engagement portion 148 (e.g., an engagement hole) with which a male engagement portion 147 (e.g., a protruding portion) provided on the front surface portion of the fuel tank 141 is engaged. Therefore, movement of the fuel tank 141 in the transverse direction of the traveling machine assembly is limited by the male engagement portion 147 of the fuel tank 141 being engaged with the female engagement portion 148 of the front wall portion 144. The movement of the fuel tank 141 in the transverse direction of the traveling machine assembly is also limited by the lateral side portion of the fuel tank 141 making contact with the lateral wall portion 145.

The lateral wall portion 145 is formed in the shape of a plate extending upward from a left end portion of the bottom portion 143. The lateral wall portion 145 partitions the fuel tank 141 from the exhaust cleaning device 118 in the transverse and longitudinal directions of the traveling machine assembly. Specifically, the engine room 109 is partitioned by the lateral wall portion 145 into a space closer to the exhaust cleaning device 118 and a space closer to the fuel tank 141 so that heat of the exhaust cleaning device 118 does not influence the fuel tank 141. Movement of the fuel tank 141 in the longitudinal direction of the traveling machine assembly is limited by a portion of the lateral wall portion 145, which partitions the fuel tank 141 from the exhaust cleaning device 118 in the longitudinal direction of the traveling machine assembly, making contact with the fuel tank 141. The movement of the fuel tank 141 in the longitudinal direction of the traveling machine assembly is also limited by the movement limiting member 158.

Bonnet Biasing Member

As described above, as shown in FIG. 19, the biasing member 128 is provided that swings and biases the bonnet 110 upward. The biasing member 128, which includes, for example, a gas spring, is located at a middle portion in the transverse direction of the traveling machine assembly. The biasing member 128 includes a tube-like member 149 linked to the bonnet 110, and a rod-like member 150 that can be inserted into and pulled out from the tube-like member 149. The biasing member 128 is allowed to be extended and compressed by the rod-like member 150 being pulled out from and inserted into the tube-like member 149. Extension and compression of the biasing member 128 allows the bonnet 110 to be swung and biased upward. In order to attach an end portion of the rod-like member 150 to the traveling machine assembly, a biasing member support member 153 that integrally includes a plate-like first support portion 151 and a plate-like second support portion 152 extending upward from the first support portion 151 is provided at a middle portion in the transverse direction of the traveling machine assembly, of the bottom portion 143 of the fuel tank support member 142. An end portion of the rod-like member 150 is attached while nipping the second support portion 152, in a manner that allows the rod-like member 150 to swing around a lateral axis. Thus, the first support portion 151 of the biasing member support member 153 is fastened to the bottom portion 143 of the fuel tank support member 142, and an end portion of the biasing member 128 is attached to the second support portion 152 of the biasing member support member 153 in a manner that allows the biasing member 128 to swing. This allows the end portion of the biasing member 128 to be attached to the fuel tank support member 142 in a manner that allows the biasing member 128 to swing. Therefore, this facilitates the attachment of the biasing member 128, and allows the bottom portion 143 of the fuel tank support member 142 to be used as a member for supporting the biasing member 128 in a manner that allows the biasing member 128 to swing. The biasing member 128 is located on the opposite side of the lateral wall portion 127 of the fuel tank support member 142 from the exhaust cleaning device 118 in the transverse direction of the traveling machine assembly. In other words, the lateral wall portion 127 is provided between the biasing member 128 and the exhaust cleaning device 118 in the transverse direction of the traveling machine assembly, whereby the biasing member 128 is located at a position where there is little influence of the heat of the exhaust cleaning device 118.

Differential Pressure Sensor of Exhaust Cleaning Device

As described above, as shown in FIGS. 16 and 19, the exhaust cleaning device 118 includes the differential pressure sensor 122 in order to determine, for example, whether or not the DPF 121 is clogged. The differential pressure sensor 122 is located at a position where there is little influence of the heat of the exhaust cleaning device 118. A sensor support member 154 is provided on the front wall portion 144 of the fuel tank support member 142, protruding forward from an upper portion of the front wall portion 144. The differential pressure sensor 122 is provided at a tip portion of the sensor support member 154. An upstream communication portion 155 that is in communication with an upstream portion of the DPF 121 and a downstream communication portion 156 that is in communication with a downstream portion of the DPF 121 are linked to the differential pressure sensor 122, which detects a differential pressure between the upstream and downstream portions of the DPF 121. Thus, the differential pressure sensor 122 is located further away from the exhaust cleaning device 118 in the transverse direction of the traveling machine assembly than is the lateral wall portion 145 of the fuel tank support member 142 which partitions the fuel tank 141 and the exhaust cleaning device 118, and therefore, is less influenced by the heat of the exhaust cleaning device 118. In order to locate the differential pressure sensor 122 at such a position, the front wall portion 144 of the fuel tank support member 142 for supporting the fuel tank 141 can be used.

Variations of Second Embodiment (1) In the above embodiment, the outer flow pipe of the double-pipe structure in the first outside air introduction portion 133, and the inner flow pipe of the double-pipe structure in the second outside air introduction portion 134, are the same middle flow pipe 136. Alternatively, the outer flow pipe of the double-pipe structure in the first outside air introduction portion 133, and the inner flow pipe of the double-pipe structure in the second outside air introduction portion 134, may be separate flow pipes.

(2) In the above embodiment, the shapes of the upstream flow pipe 135, the middle flow pipe 136, and the downstream flow pipe 139 may be changed when necessary. For example, the flow path cross-sections of all the flow pipes may be in a circular shape, or in a polygonal shape as with the downstream flow pipe 139.

(3) In the above embodiment, the amount of outside air introduced in the first outside air introduction portion 133 and the amount of outside air introduced in the second outside air introduction portion 134 may be set to be substantially the same.

(4) In the above embodiment, the first outside air introduction portion 133 and the second outside air introduction portion 134 have the double-pipe structure. The present invention is not limited to this double-pipe structure. Alternatively, for example, an outside air introduction portion may include an upstream flow pipe and a downstream flow pipe, and an opening may be formed at an intermediate point or the like of the downstream flow pipe. Exhaust gas may be caused to enter from the upstream flow pipe into the opening, whereby outside air may be introduced from the surrounding of the upstream flow pipe through the opening into the downstream flow pipe by an ejector action of the inflow of the exhaust gas, to be mixed into the exhaust gas.

(5) In the above embodiment, a tractor is illustrated as a working vehicle. Alternatively, for example, the present invention is applicable to other working vehicles, such as a combine harvester, construction equipment, and the like.

What is claimed is:

1. A working vehicle comprising:
a traveling machine assembly;
a drive unit;
a bonnet configured to cover the drive unit; and
a cover provided below the bonnet and configured to be removably attached to the traveling machine assembly, including
a main body portion extending in a longitudinal direction of the traveling machine assembly,
a first male engagement portion provided at a front end portion of the main body portion,
a second male engagement portion provided at a rear end portion of the main body portion, and
a third male engagement portion provided at a lower end portion of the main body portion,
wherein
the traveling machine assembly includes a first female engagement portion configured to be engaged with the first male engagement portion, a second female engagement portion configured to be engaged with the second male engagement portion, and a third female engagement portion configured to be engaged with the third male engagement portion,
the first male engagement portion and the first female engagement portion, when engaged together, permit the main body portion to move in the longitudinal direction of the traveling machine assembly,
the second male engagement portion and the second female engagement portion, when engaged together, permit the main body portion to move in the longitudinal direction of the traveling machine assembly,
a position where the third male engagement portion and the third female engagement portion are engaged together is within a range in which the main body portion is permitted to move in the longitudinal direction of the traveling machine assembly, when the first male engagement portion and the first female engagement portion are engaged together and the second male engagement portion and the second female engagement portion are engaged together, and the third male engagement portion and the third female engagement portion, when engaged together, limit movement of the main body portion in the longitudinal direction of the traveling machine assembly.

2. The working vehicle according to claim 1, wherein the amount of movement of the main body portion in the longitudinal direction of the traveling machine assembly that is permitted when the first male engagement portion and the first female engagement portion are engaged together is different from the amount of movement of the main body portion in the longitudinal direction of the traveling machine assembly that is permitted when the second male engagement portion and the second female engagement portion are engaged together.

3. The working vehicle according to claim 1, wherein the first male engagement portion is a first protruding portion protruding from the main body portion toward a front of the traveling machine assembly, the second male engagement portion is a second protruding portion protruding from the main body portion toward a rear of the traveling machine assembly, the first female engagement portion is a first insertion hole into which the first protruding portion is inserted in the longitudinal direction of the traveling machine assembly, and the second female engagement portion is a second insertion hole into which the second protruding portion is inserted in the longitudinal direction of the traveling machine assembly.

4. The working vehicle according to claim 1, wherein the main body portion has a wider portion on a front side thereof and a narrower portion on a rear side thereof, and the third male engagement portion is located at the wider portion.

5. The working vehicle according to claim 1, wherein the cover is arranged to cover a lateral outer surface with respect to the traveling machine assembly of an exhaust pipe linked to an engine of the drive unit.

6. The working vehicle according to claim 1, wherein the first female engagement portion is formed in an accessory of an engine of the drive unit.

7. The working vehicle according to claim 1, further comprising:

an exhaust pipe configured to allow exhaust gas from an engine to be emitted to the outside, wherein the exhaust pipe includes a first emission pipe linked to the engine and a second emission pipe provided downstream of the first emission pipe, and the second emission pipe includes an upstream-end opening provided at an upstream end of the second emission pipe, and a first upper opening provided at an upstream portion of an upper surface of the second emission pipe and continuous to the upstream-end opening, and a downstream end portion of the first emission pipe is located at the first upper opening with a gap being provided between the downstream end portion of the first emission pipe and an edge portion of the first upper opening.

8. The working vehicle according to claim 7, wherein a second upper opening is provided in a portion downstream of the first upper opening of the upper surface of the second emission pipe.

9. The working vehicle according to claim 7, wherein the first emission pipe has a smaller cross-sectional area at the downstream end portion than upstream of the downstream end portion of the first emission pipe.

10. A working vehicle comprising:

an engine;

a bonnet configured to form an engine room for accommodating the engine;

an exhaust path configured to allow exhaust gas from the engine to be emitted to the outside, including an internal flow path portion provided inside the engine room, and an external flow path portion provided outside the engine room; and an outside air introduction portion configured to allow outside air to be introduced at an intermediate point of the exhaust path so that the outside air is mixed into the exhaust gas, including a first outside air introduction portion provided in the internal flow path portion of the exhaust path and configured to allow air inside the engine room to be introduced as the outside air, and a second outside air introduction portion provided in the external flow path portion of the exhaust path and configured to allow air outside the engine room to be introduced as the outside air;

wherein the first outside air introduction portion includes a first flow pipe, and a second flow pipe having a larger flow path cross-sectional area than that of the first flow pipe, and a downstream end portion of the first flow pipe and an upstream-end portion of the second flow pipe form a double-pipe structure in which the first flow pipe is located inside the second flow pipe with a gap being interposed between the first flow pipe and the second flow pipe, and the second outside air introduction portion includes a third flow pipe, and a fourth flow pipe having a larger flow path cross-sectional area than that of the third flow pipe, and a downstream end portion of the third flow pipe and an upstream-end portion of the fourth flow pipe form a double-pipe structure in which the third flow pipe is located inside the fourth flow pipe with a gap being interposed between the third flow pipe and the fourth flow pipe.

11. The working vehicle according to claim 10, wherein in the engine room, a cooling fan configured to blow air backward is provided, and the first outside air introduction portion is located behind the cooling fan.

12. The working vehicle according to claim 10, wherein the second outside air introduction portion is configured to introduce a larger amount of the outside air than that of the first outside air introduction portion.

13. The working vehicle according to claim 10, wherein in the engine room, an exhaust cleaning device configured to clean exhaust gas from the engine is provided, and the exhaust path is configured to allow the exhaust gas cleaned by the exhaust cleaning device to flow to the outside, and the bonnet includes an opening at a position corresponding to an upper portion of the exhaust cleaning device.

* * * * *